United States Patent
Flankl et al.

(10) Patent No.: US 11,101,725 B2
(45) Date of Patent: Aug. 24, 2021

(54) ROTARY ELECTRIC MACHINE AND NON-CONTACT POWER GENERATOR

(71) Applicant: NABTESCO CORPORATION, Tokyo (JP)

(72) Inventors: Michael Flankl, Zurich (CH); Arda Tueysuez, Zurich (CH); Johann W. Kolar, Zurich (CH); Yusuke Tsukada, Hyogo (JP); Kazuhito Nakamura, Kyoto (JP)

(73) Assignee: NABTESCO CORPORATION, Tokyo (JP)

( * ) Notice: Subject to any disclaimer, the term of this patent is extended or adjusted under 35 U.S.C. 154(b) by 330 days.

(21) Appl. No.: 15/834,784

(22) Filed: Dec. 7, 2017

(65) Prior Publication Data

US 2018/0159417 A1 Jun. 7, 2018

Related U.S. Application Data

(63) Continuation of application No. PCT/JP2016/067254, filed on Jun. 9, 2016.

(30) Foreign Application Priority Data

Jun. 10, 2015 (JP) .............................. JP2015-117764

(51) Int. Cl.
*H02K 49/10* (2006.01)
*H02K 49/04* (2006.01)
(Continued)

(52) U.S. Cl.
CPC ......... *H02K 49/046* (2013.01); *H02K 1/2793* (2013.01); *H02K 7/11* (2013.01);
(Continued)

(58) Field of Classification Search
CPC ...... H02K 49/00; H02K 49/04; H02K 49/046; H02K 49/08; H02K 49/10; H02K 49/104;
(Continued)

(56) References Cited

U.S. PATENT DOCUMENTS

| 3,523,204 A | * | 8/1970 | Sydney | .................. | H02K 49/06 310/94 |
| 4,922,162 A | * | 5/1990 | Shiraki | .................. | H02K 29/06 310/156.32 |

(Continued)

FOREIGN PATENT DOCUMENTS

| GB | 2517467 A | 2/2015 |
| JP | 2002-010573 A | 1/2002 |

(Continued)

OTHER PUBLICATIONS

International Preliminary Report on Patentability and Written Opinion of the International Searching Authority PCT/JP2016/067254 dated Dec. 12, 2017.

(Continued)

*Primary Examiner* — Tran N Nguyen
(74) *Attorney, Agent, or Firm* — Pillsbury Winthrop Shaw Pittman, LLP

(57) ABSTRACT

Provided is a rotary electric machine including: a permanent magnet rotatable around a first rotational shaft and disposed at a distance from a main surface of a moving body rotating or moving, at least a part of a side surface of the permanent magnet continuous to an outer peripheral surface thereof being opposed to the main surface of the moving body, wherein the permanent magnet is rotated around the first rotational shaft by a reaction force acting on the permanent magnet, the reaction force being caused by eddy currents produced in the main surface of the moving body in such a direction as to hinder a change of magnetic flux from the permanent magnet, and a surface speed of the side surface (Continued)

of the permanent magnet opposed to the moving body is lower than a surface speed of the main surface of the moving body opposed thereto.

19 Claims, 23 Drawing Sheets

(51) Int. Cl.
*H02K 7/11* (2006.01)
*H02K 7/18* (2006.01)
*H02K 21/24* (2006.01)
*H02K 1/27* (2006.01)
*H02K 16/02* (2006.01)
*H02K 17/02* (2006.01)
*H02K 17/42* (2006.01)

(52) U.S. Cl.
CPC ......... *H02K 7/1807* (2013.01); *H02K 7/1846* (2013.01); *H02K 16/02* (2013.01); *H02K 17/02* (2013.01); *H02K 17/42* (2013.01); *H02K 21/24* (2013.01); *H02K 49/10* (2013.01)

(58) Field of Classification Search
CPC .......... H02K 17/00; H02K 17/02; H02K 7/00; H02K 7/003; H02K 7/11; H02K 7/116; H02K 7/18; H02K 7/18; H02K 7/1807; H02K 7/182; H02K 7/1823; H02K 7/183; H02K 7/184; H02K 7/1846; H02K 16/00; H02K 16/02; F03B 13/10; F03D 7/00; F03D 15/00; F03D 9/00; F03D 9/25; F03D 9/255
See application file for complete search history.

(56) References Cited

U.S. PATENT DOCUMENTS

| 2014/0070675 | A1 | 3/2014 | Linnebjerg | |
|---|---|---|---|---|
| 2014/0085914 | A1 | 3/2014 | Liao | |
| 2014/0132155 | A1 | 5/2014 | Strothmann | |
| 2014/0346777 | A1* | 11/2014 | Blanchet | H02K 5/12 290/54 |
| 2016/0111936 | A1* | 4/2016 | Halstead | H02K 7/183 290/43 |

FOREIGN PATENT DOCUMENTS

| JP | 2007-006545 | A | 1/2007 |
|---|---|---|---|
| JP | 2008-271614 | A | 11/2008 |
| JP | 5673899 | B2 | 1/2015 |
| WO | 2013/169943 | A1 | 11/2013 |

OTHER PUBLICATIONS

Extended European Search Report dated Dec. 10, 2018 issued in corresponding European Patent Application No. 16807571.1.
International Search Report PCT/JP2016/067254 dated Aug. 23, 2016 with English translation.
Office Action dated Feb. 20, 2020 issued in corresponding European Patent Application No. 16807571.1.

* cited by examiner

ROTARY ELECTRIC MACHINE AND NON-CONTACT POWER GENERATOR

CROSS-REFERENCE TO RELATED APPLICATIONS

This application is based upon and claims the benefit of priority from Japanese Patent Application No. 2015-117764, filed on Jun. 10, 2015; the entire contents of which are incorporated herein by reference.

TECHNICAL FIELD

The present invention relates to a rotary electric machine that rotates contactlessly and a non-contact power generator that generates power contactlessly.

BACKGROUND

A bicycle dynamo that generates electricity without contact is disclosed in United States Patent Application Publication No. 2014/0132155 ("the '155 Publication"). In a bicycle dynamo of the '155 Publication, an outer peripheral surface of annular permanent magnet that rotates about a rotation axis extending in a direction orthogonal to a rotation axis of a bicycle wheel is spaced apart from a side surface of the wheel that is continues with an outer peripheral surface of the wheel.

In the permanent magnet, magnetic poles are aligned in the circumferential direction and the magnetization directions of adjacent magnetic poles are opposite to one another. For example, when the wheel rotates with the N pole of the permanent magnet facing the side surface of the wheel, eddy currents are generated on the side surface of the wheel in such a direction as to hinder the change of the magnetic flux of the permanent magnet. A repulsive force and attractive force between the magnetic flux generated by the eddy current and the magnetic flux from the permanent magnet cause the permanent magnet to rotate in the rotation direction of the wheel.

Thus, when a coil is wound around the permanent magnet and the magnetic flux from the permanent magnet is linked with the coil, it is possible to obtain an induced electric power from the coil.

However, the bicycle dynamo disclosed in the '155 Publication has the following drawbacks.

1. Due to a limited area of the permanent magnet disposed so as to face a side surface of the wheel the amount of magnetic coupling between the wheel and the permanent magnet cannot be increased. Accordingly eddy currents generated in the wheel cannot be increased, and a rotational force of the permanent magnet becomes relatively weak.

2. In the '155 Publication, a single phase coil is wound around the permanent magnet. However, with the single phase coil, the magnetic flux from a part of the permanent magnet where the coil is not wound cannot be effectively utilized and the amount of the linkage magnetic flux cannot be increased. Moreover, in the case where the polarities of portions of the permanent magnet where the coil is wound around are symmetrical with respect to the rotation axis, the net amount of the magnetic fluxes linked with the coil is always canceled out so that it is not possible to generate electric power.

3. Because the magnetic flux from the permanent magnet propagates in the air, it receives a large magnetic resistance and therefore a high magnetic efficiency cannot be obtained.

4. Because a yoke is not utilized, leakage of magnetic flux is likely to occur. Further when an electrically conductive material is placed therearound, a magnetic path is changed by the material and it may affect the power generation amount.

SUMMARY

The present disclosure is intended to overcome the above problems, and one object thereof is to provide a rotary electric machine and a non-contact power generator having a high magnetic efficiency and less prone to magnetic flux leakage.

To overcome the above drawbacks, one aspect of the present disclosure provides a rotary electric machine comprising: a permanent magnet rotatable around a first rotational shaft and disposed at a distance from a main surface of a moving body rotating or moving, at least a part of a side surface of the permanent magnet continuous to an outer peripheral surface thereof being opposed to the main surface of the moving body, wherein the permanent magnet is rotated around the first rotational shaft by a reaction force acting on the permanent magnet, the reaction force being caused by eddy currents produced in the main surface of the moving body in such a direction as to hinder a change of magnetic flux from the permanent magnet, and a surface speed of the side surface of the permanent magnet opposed to the moving body is lower than a surface speed of the main surface of the moving body opposed thereto.

When the moving body moves in one direction, the permanent magnet may rotate around the first rotational shaft in a rotational direction corresponding to the one direction, the first rotational shaft extending in a direction intersecting the one direction.

When the moving body rotates around a second rotational shaft, the permanent magnet may rotate around the first rotational shaft parallel to the second rotational shaft in a rotational direction corresponding to a rotational direction of the moving body.

At least a part of the side surface of the permanent magnet continuous to the outer peripheral surface thereof may be opposed at a distance to at least a part of a side surface of the moving body continuous to an outer peripheral surface thereof, and the permanent magnet may be rotated in a direction corresponding to the rotational direction of the moving body by a reaction force acting on the permanent magnet, the reaction force being caused by eddy currents produced on the side surface of the moving body continuous to the outer peripheral surface thereof in such a direction as to hinder a change of magnetic flux from the permanent magnet.

Half or less of a total area of the side surface of the permanent magnet on a moving body side may be opposed to the moving body.

The first rotational shaft may be positioned in an extension of the second rotational shaft, an entirety of the side surface of the permanent magnet on a moving body side may be opposed to the moving body, and the permanent magnet may rotate in a same direction as the moving body.

The permanent magnet may include two or more magnetic poles opposed to the moving body, each of the two or more magnetic poles being magnetized in a direction toward the moving body opposed thereto or a direction opposite thereto.

The rotary electric machine may further include one or more coils arranged at such positions as to be linked with magnetic flux from the permanent magnet, the one or more coils producing an induced current according to an amount of change of the magnetic flux linked with the one or more coils.

The permanent magnet may include two or more magnetic poles opposed to the moving body, and the one or more coils may be provided for each of one or more of the two or more magnetic poles.

The one or more coils may be provided on another side surface of the permanent magnet opposite to the side surface thereof opposed to the moving body.

The one or more coils may be provided between the side surface of the permanent magnet opposed to the moving body and the main surface of the moving body.

The permanent magnet may have Halbach array structure.

The rotary electric machine may include a magnetic flux guide member provided in at least a part of a magnetic path of the magnetic flux running from the permanent magnet, linked with the one or more coils, and returning to the permanent magnet.

The one or more coils may be provided on another side surface of the permanent magnet opposite to the side surface thereof opposed to the moving body, and the magnetic flux guide member may be disposed on a surface of the one or more coils opposite to a surface thereof opposed to the permanent magnet.

The magnetic flux guide member may be disposed on the side surface of the permanent magnet on a moving body side at a portion not opposed to the moving body.

The one or more coils may be provided on another side surface of the permanent magnet opposite to the side surface thereof opposed to the moving body, and the magnetic flux guide member may comprise: a first magnetic flux guide member disposed on a surface of the one or more coils opposite to a surface thereof opposed to the permanent magnet; and a second magnetic flux guide member disposed on the side surface of the permanent magnet on a moving body side at a portion not opposed to the moving body.

The second magnetic flux guide member may be disposed in a part of a region in which the permanent magnet and the moving body are opposed to each other.

The rotary electric machine may include one or more core members inserted into the one or more coils to increase a density of magnetic flux passing the one or more coils.

The rotary electric machine may include a magnetic flux guide member having an annular shape and passed by the magnetic flux from the permanent magnet, wherein the one or more coils may be wound around the magnetic flux guide member.

The rotary electric machine may include a drive body to be driven by a rotational force of the first rotational shaft.

The drive body may be a motor.

Another aspect of the present disclosure provides a non-contact power generator comprising: a permanent magnet opposed at a distance to a main surface of a moving body rotating or moving, the permanent magnet rotating in accordance with a direction of rotation or movement of the moving body; a first coil opposed at a distance to the main surface of the moving body and disposed at a position linked with magnetic flux from the permanent magnet; and a magnetic flux guide member provided in at least a part of a magnetic path of the magnetic flux running from the permanent magnet, linked with the first coil, and returning to the permanent magnet, wherein a circumferential speed of the permanent magnet is lower than a surface speed of the main surface of the moving body opposed thereto.

The non-contact power generator may further include a second coil opposed at a distance to the main surface of the moving body and disposed at a position linked with the magnetic flux from the permanent magnet, wherein the magnetic flux guide member may be disposed in at least a part of the magnetic path of the magnetic flux running from the permanent magnet, linked with the first coil and returning to the permanent magnet and at least a part of a magnetic path of the magnetic flux running from the permanent magnet, linked with the second coil, and returning to the permanent magnet.

When the moving body rotates around a predetermined rotational shaft, the permanent magnet may rotate around a rotational shaft extending in a direction intersecting the predetermined rotational shaft or in a direction parallel with the predetermined rotational shaft, and an outer peripheral surface of the permanent magnet opposed at a distance to the main surface of the moving body may rotate in a same direction as the main surface of the moving body.

Another aspect of the present disclosure provides a rotary electric machine comprising: a permanent magnet rotatable around a first rotational shaft and disposed at a distance from a main surface of a moving body rotatable or movable, at least a part of a side surface of the permanent magnet continuous to an outer peripheral surface thereof being opposed to the main surface of the moving body, wherein the permanent magnet rotates or moves the moving body by a reaction force acting on the permanent magnet, the reaction force being caused by eddy currents produced in the main surface of the moving body in such a direction as to hinder a change of magnetic flux from the permanent magnet.

Another aspect of the present disclosure provides a non-contact power generator comprising: a permanent magnet rotatable around a first rotational shaft and disposed at a distance from a main surface of a moving body rotating or moving, at least a part of a side surface of the permanent magnet continuous to an outer peripheral surface thereof being opposed to the main surface of the moving body, and one or more coils arranged at such positions as to be linked with magnetic flux from the permanent magnet, the one or more coils producing an induced current according to an amount of change of the magnetic flux linked with the one or more coils, wherein the permanent magnet is rotated around the first rotational shaft by a reaction force acting on the permanent magnet, the reaction force being caused by eddy currents produced in the main surface of the moving body in such a direction as to hinder a change of magnetic flux from the permanent magnet, and a surface speed of the side surface of the permanent magnet opposed to the moving body is lower than a surface speed of the main surface of the moving body opposed thereto.

The present disclosure provides a rotary electric machine and a non-contact power generator having a high magnetic efficiency and less prone to magnetic flux leakage.

DETAILED DESCRIPTION

Embodiments of the disclosure will be described hereinafter with reference to the drawings. The following description of the embodiments will be focused on typical configuration and operation in a rotary electric machine and a non-contact power generator, but the rotary electric machine and the non-contact power generator may have other configurations and operations omitted in the following description. These omitted configurations and operations are included in the scope of the embodiments.

First Embodiment

Figure 1:
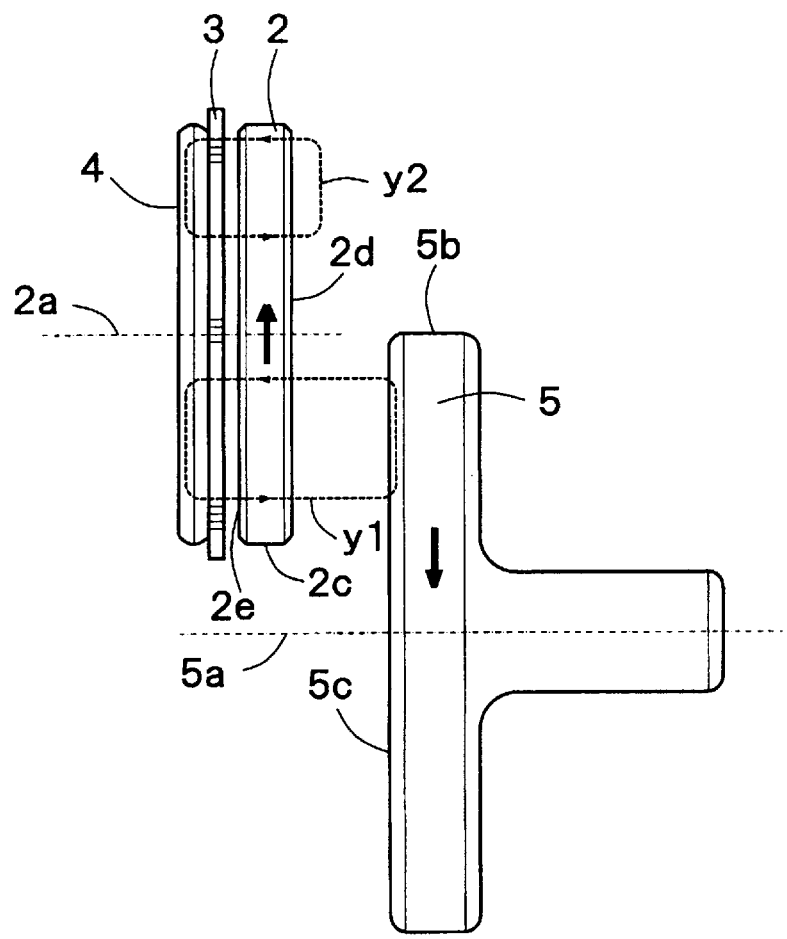
FIG. 1 is a front view of a non-contact power generator according to a first embodiment of the present disclosure.
Figure 2:
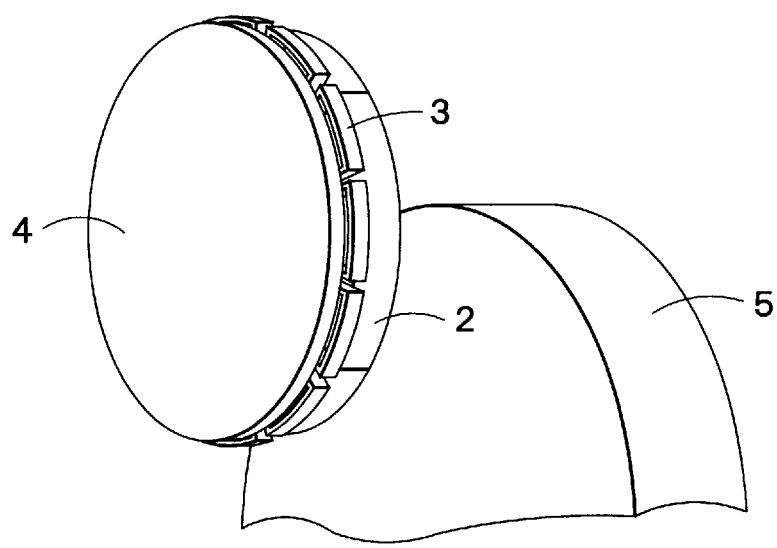
FIG. 2 is a perspective view of the non-contact power generator according to the first embodiment of the present disclosure.

FIG. 1 is a front view of a non-contact power generator 1 according to a first embodiment of the present disclosure, and FIG. 2 is a perspective view of the same. The non-contact power generator 1 of FIG. 1 includes an annular permanent magnet 2, a coil 3, and a yoke (a magnetic flux guide member) 4.

Figure 3:
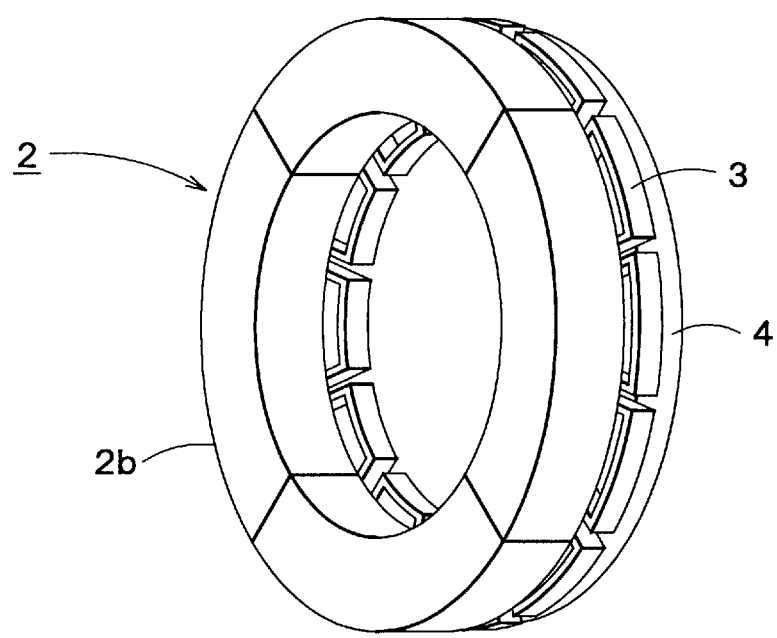
FIG. 3 is a perspective view of a permanent magnet.

The permanent magnet 2 is rotatable around a rotational shaft 2a. As shown in FIG. 3, the permanent magnet 2 includes a plurality of magnetic poles 2b arranged circumferentially. FIG. 3 shows an example having four magnetic poles 2b, but the number of magnetic poles 2b is not limited One or more magnetic poles 2b may be included.

A rotating body 5, which is spaced apart from the permanent magnet 2, rotates around the rotational shaft 5a. The rotating body 5 rotates around the rotational shaft 5a either in only one direction or in both directions.

As shown in FIG. 1, the rotational shaft 2a of the permanent magnet 2 is parallel with the rotational shaft 5a of the rotating body 5, and at least a part of a side surface 2d that is continuous to an outer peripheral surface 2c of the permanent magnet 2 is opposed to a side surface Sc that is continuous to an outer peripheral surface 5b of the rotating body 5. More specifically, two or more of the plurality of magnetic poles 2b included in the permanent magnet 2 are opposed to the side surface Sc of the rotating body 5. Thus, as will be described later, the amount of magnetic coupling between the permanent magnet 2 and the rotating body 5 can be increased, and eddy currents occurring on the side surface Sc of the rotating body 5 can be increased.

Examples of the rotating body 5 include a wheel of a vehicle. The rotating body 5 produces eddy currents on the side surface Sc opposed to the permanent magnet 2. To produce the eddy currents, at least the side surface 5c of the rotating body 5 needs to be formed of an electrically conductive material such as a metal.

In the embodiment, the eddy currents are produced on the side surface Sc of the rotating body 5 by the magnetic flux from the magnetic poles 2b of the permanent magnet 2. Therefore, the distance between the side surface 2d of the permanent magnet 2 and the side surface Sc of the rotating body 5 is limited to a range within which the magnetic flux from the magnetic poles 2b of the permanent magnet 2 can reach the rotating body 5.

Figure 4:
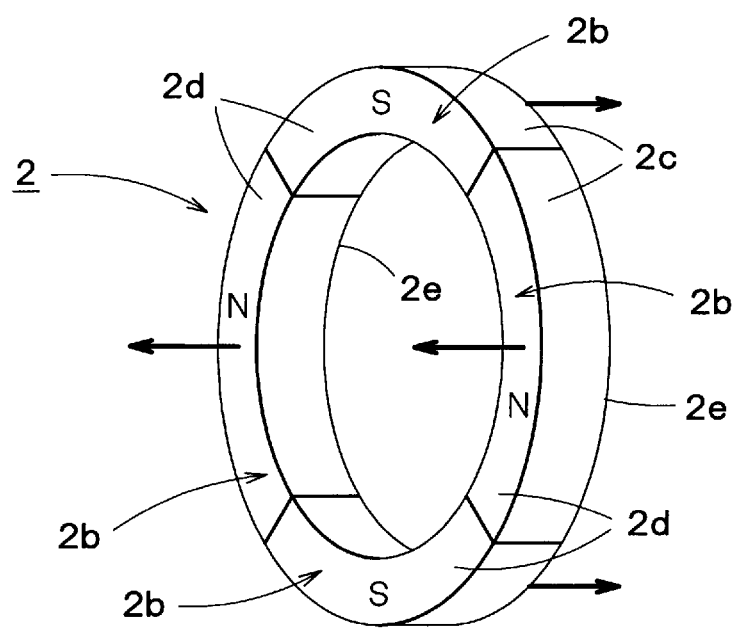
FIG. 4 shows directions of magnetization of the permanent magnet.

The magnetic poles 2b of the permanent magnet 2 are magnetized in the direction toward the side surface 2d of the permanent magnet 2 or the direction opposite thereto. The adjacent magnetic poles 2b of the permanent magnet 2 are magnetized in opposite directions. In FIG. 4, the directions of magnetization of the magnetic poles 2b of the permanent magnet 2 are indicated by arrows. As shown in FIG. 4, the side surface 2d of the permanent magnet 2 includes N-poles and S-poles alternating circumferentially. In a side surface 2e of the permanent magnet 2 opposite to the side surface 2d opposed to the rotating body 5, the polarities are opposite to those in the side surface 2d.

Figure 5:
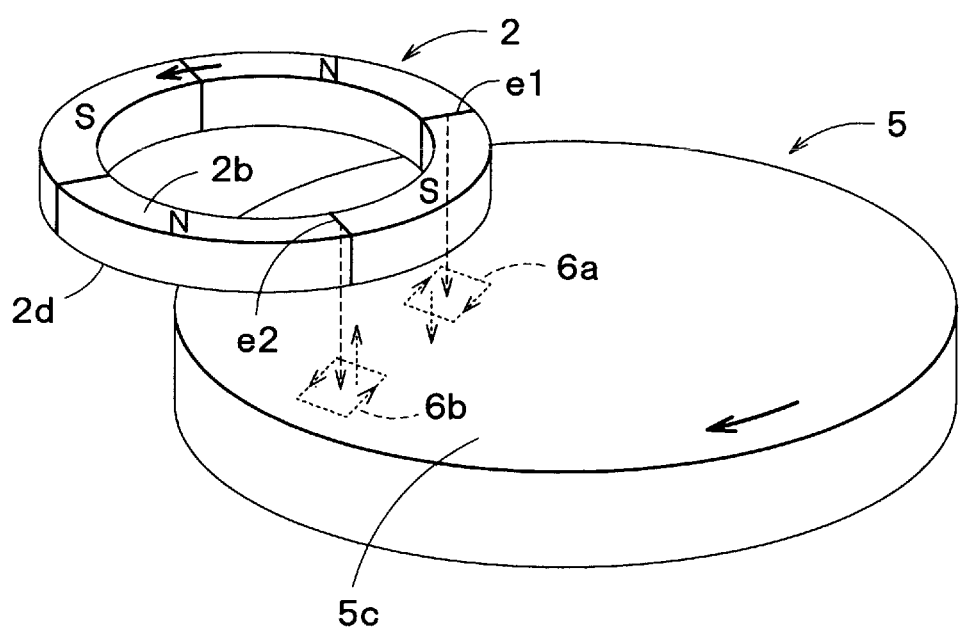
FIG. 5 explains the principle of rotation of the permanent magnet caused by eddy currents occurring on a side surface of a rotating body.

FIG. 5 explains the principle of rotation of the permanent magnet 2 caused by eddy currents 6a, 6b occurring on the side surface Sc of the rotating body 5. The magnetic flux from the magnetic poles 2b opposed to the side surface Sc of the rotating body 5, among the plurality of magnetic poles 2b arranged circumferentially on the side surface 2d of the permanent magnet 2, propagates toward the side surface Sc of the rotating body 5. The magnetic poles 2b from the permanent magnet 2 propagates through an air gap between the side surface 2d of the permanent magnet 2 and the side surface Sc of the rotating body 5.

When the rotating body 5 rotates, eddy currents occur on the side surface Sc of the rotating body 5 in such a direction as to hinder a change of the magnetic flux from the permanent magnet 2. The permanent magnet 2 is rotated by the interaction (the repulsive force and the attractive force) between the magnetic flux produced by the eddy currents and the magnetic flux from the permanent magnet 2. However, the surface speed of the side surface 2d of the permanent magnet 2 is smaller than the surface speed of the side surface Sc of the rotating body 5 opposed thereto.

For example, when an N-pole of the permanent magnet 2 is opposed to the side surface Sc of the rotating body 5, the direction of the eddy current 6a occurring on the side surface Sc of the rotating body 5 at a portion reached by the magnetic flux from an edge e1 of the N-pole at the front in the rotational direction is different from the direction of the eddy current 6b occurring on the side surface Sc of the rotating body 5 at a portion reached by the magnetic flux from an edge e2 of the N-pole at the rear in the rotational direction. The eddy current 6b produced by the magnetic flux from the edge e2 of the N-pole at the rear in the rotational direction flows in such a direction as to produce magnetic flux in an opposite direction to the magnetic flux from the N-pole. On the other hand, the eddy current 6a produced on the side surface Sc of the rotating body 5 at a portion reached by the magnetic flux from the edge e1 of the N-pole at the front in the rotational direction flows in such a direction as to produce magnetic flux in the same direction as the magnetic flux from the N-pole. Both eddy currents 6a, 6b flow in such a direction as to hinder a change of the magnetic flux from the permanent magnet 2 caused by rotation of the rotating body 5.

As described above, on the edge e1 side of the N-pole of the permanent magnet 2 at the front in the rotational direction, the direction of the magnetic flux caused by the eddy current 6a is the same as the direction of the magnetic flux from the N-pole of the permanent magnet 2. Therefore, an attractive force acts between these magnetic fluxes. On the other hand, on the edge e2 side of the N-pole of the permanent magnet 2 at the rear in the rotational direction, the direction of the magnetic flux caused by the eddy current 6b is opposite to the direction of the magnetic flux from the N-pole of the permanent magnet 2. Therefore, a repulsive force acts between these magnetic fluxes. When the surface speed of the side surface 2d of the permanent magnet 2 is smaller than the surface speed of the side surface Sc of the rotating body 5 opposed thereto, the above-described relationship between the permanent magnet 2 and the eddy currents 6a, 6b holds true at all time. Thus, the permanent magnet 2 rotates at a surface speed smaller than the surface speed of the side surface Sc of the rotating body 5 opposed thereto, so as to run after the moving surface of the side surface Sc of the rotating body 5 opposed thereto.

The principle of rotation of the permanent magnet 2 can also be described in terms of a reaction force based on Lorentz force. As described above, the direction of the eddy current 6a produced by the magnetic flux from the edge e1 of the N-pole of the permanent magnet 2 at the front in the rotational direction is opposite to the direction of the eddy current 6b produced by the magnetic flux from the edge e2 of the permanent magnet 2 at the rear in the rotational direction, and therefore, a current flows in a constant direction under the N-pole at all time. When the rotating body 5 rotates in the direction indicated by the arrow in FIG. 5, the current produced by the eddy currents 6a, 6b is subjected to Lorentz force in the direction opposite to the rotational direction of the rotating body 5. Therefore, the permanent magnet 2 subjected to the magnetic flux produced by the eddy currents 6a, 6b is rotated by the reaction force based on Lorentz force, the reaction force acting in the rotational direction of the rotating body 5.

Thus, the permanent magnet 2 and the rotating body 5 move in the same direction at the opposed surfaces thereof. Therefore, when the permanent magnet 2 is opposed to the rotating body 5 at a position offset from the rotational shaft of the rotating body 5, as shown in FIG. 5, the rotational direction of the permanent magnet 2 is opposite to the rotational direction of the rotating body 5.

As shown in FIG. 1, the coil 3 is opposed to the side surface 2e of the permanent magnet 2 on the opposite side to the side surface 2d opposed to the rotating body 5. An air gap is provided between the coil 3 and the side surface 2e of the permanent magnet 2 opposed thereto. The coil 3 is fixed, and the magnetic flux from the rotating permanent magnet 2 is linked with the coil 3. Since the polarities of the plurality of magnetic poles 2b of the permanent magnet 2 arranged circumferentially alternate, the direction of the magnetic flux linked with the coil 3 alternates periodically. Therefore, in the coil 3, an induced current occurs in such a direction as to hinder a change of the magnetic flux from the permanent magnet 2, and this induced current can be extracted to obtain an alternating induced power.

As indicated by the arrows y1, y2 in FIG. 1, the magnetic flux from the permanent magnet 2 is linked with the coil 3 and then propagates through the air to return to the permanent magnet 2. The path passed by the magnetic flux is called a magnetic path. When most part of a magnetic path is occupied by the air, which has a large magnetic resistance, the density of the magnetic flux passing the coil 3 is small, and a resultant induced current is also small. In addition, it is possible that the magnetic flux leaks while propagating through the air or the magnetic path is altered due to an effect of an electrically conductive material in the perimeter. As shown in FIG. 1, it is desirable that a yoke 4 is provided in the magnetic path passed by the magnetic flux linked with the coil 3 The yoke 4 is formed of a material having a high magnetic permeability such as iron. For example, the yoke 4 is tightly attached to the surface of the coil 3 opposite to the surface thereof opposed to the permanent magnet 2 such that the magnetic flux linked with the coil 3 is guided to the yoke 4 without leakage and propagates through the yoke 4 to return to the permanent magnet 2. Thus, the leakage of the magnetic flux can be prevented and the magnetic efficiency can be increased.

As described above, eddy currents occur on the side surface Sc of the rotating body 5 at the portion opposed to the side surface 2d of the permanent magnet 2. Depending on the location where the eddy currents occur, the rotation of the permanent magnet 2 may be hindered. Therefore, in FIG. 1, less than half of the total area of the side surface of the permanent magnet 2 opposed to the rotating body 5 is opposed to the rotating body 5. In other words, in FIG. 1, no eddy current occurs on the side surface Sc of the rotating body 5 above the rotational shaft 2a of the permanent magnet 2. Thus, eddy currents are produced on the side surface Sc of the rotating body 5 by the magnetic flux from the portion of the permanent magnet 2 below the rotational shaft thereof. These eddy currents contribute to the rotation of the permanent magnet 2 in the direction opposite to the rotational direction of the rotating body 5. When half or more of the total area of the side surface of the permanent magnet 2 opposed to the rotating body 5 is opposed to the rotating body 5, eddy currents that hinder rotation of the permanent magnet 2 are produced on the side surface of the rotating body 5 by the magnetic flux from the portion of the permanent magnet 2 above the rotational shaft 2a thereof. Therefore, it is desirable that less than half of the total area of the side surface of the permanent magnet 2 opposed to the rotating body 5 is opposed to the rotating body 5.

Figure 6:
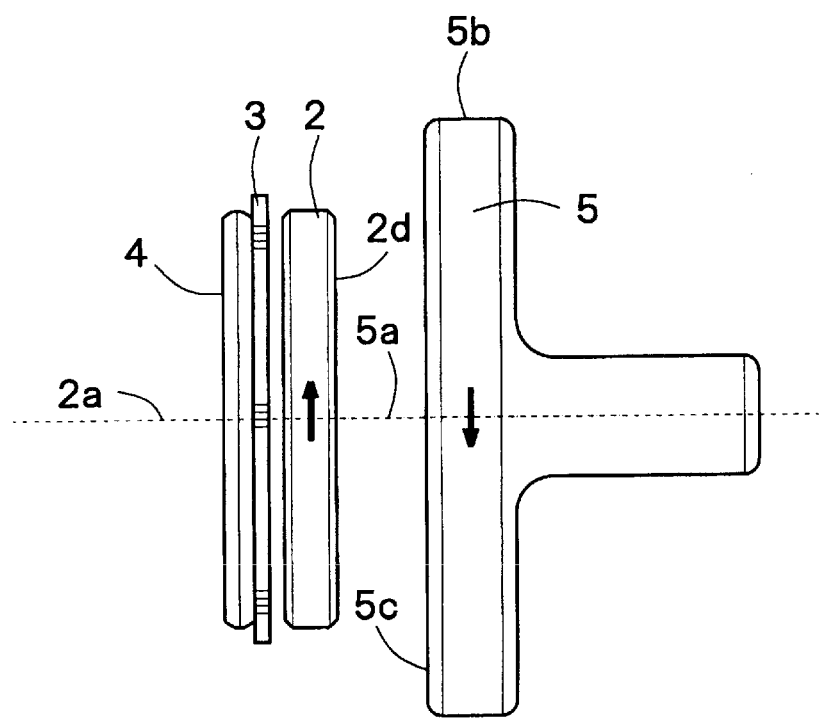
FIG. 6 shows that a rotational shaft of the rotating body is arranged on the extension of the rotational shaft of the permanent magnet.

FIG. 6 shows that the rotational shaft 2a of the permanent magnet 2 is positioned on the extension of the rotational shaft 5a of the rotating body 5. In this case, even when the entirety of the side surface 2d of the permanent magnet 2 is opposed to the side surface 5c of the rotating body 5, the eddy currents occurring on the side surface 5c of the rotating body 5 contribute to rotation in the same direction of the permanent magnet 2 and the rotating body 5. Therefore, as in FIG. 6, when the rotational shaft 5a of the rotating body 5 is aligned with the rotational shaft 2a of the permanent magnet 2, eddy currents produced by all of the magnetic flux from the side surface 2d of the permanent magnet 2 can be effectively utilized for rotation of the permanent magnet 2.

Figure 7:
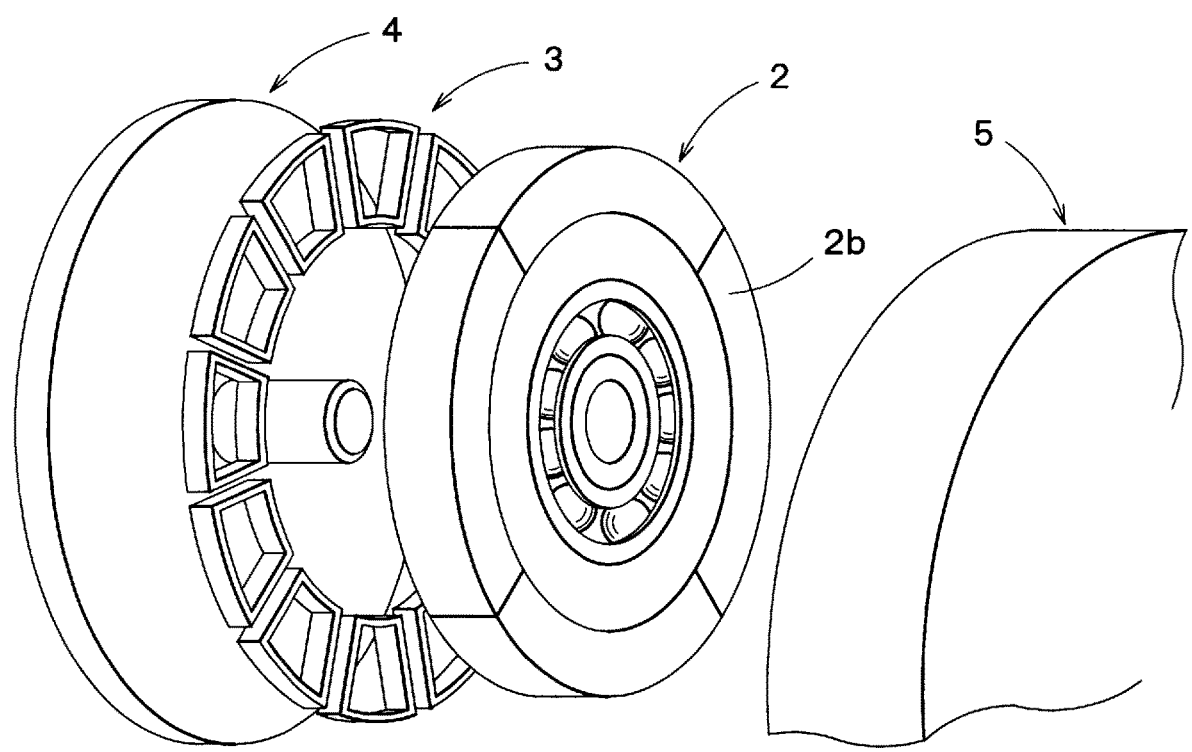
FIG. 7 is an exploded perspective view of the non-contact power generator according to the embodiment.

FIG. 7 is an exploded perspective view of the non-contact power generator 1 according to the embodiment. As shown in FIG. 7, one or more coils 3 are provided for each magnetic pole 2b of the permanent magnet 2. FIG. 7 shows that three coils 3 are provided for each magnetic pole 2b, but the number of coils 3 provided for each magnetic pole 2b is not particularly limited. The coils 3 are shaped to the outer shape and size of the magnetic poles 2b such that almost all of the magnetic flux from the corresponding magnetic poles 2b is linked with the coils 3. Thus, the magnetic flux from each magnetic pole 2b of the permanent magnet 2 is linked with one or more coils 3, and almost no magnetic flux fails to be linked with the coils 3 as leaked magnetic flux.

FIG. 7 shows that the coils 3 shaped to the outer shape and size of the magnetic poles 2b are arranged annularly such that almost all of the magnetic flux from the magnetic poles 2b of the permanent magnet 2 is linked with the coils 3, but the coils 3 do not necessarily cover all the magnetic poles 2b. More specifically, it is possible that the coils 3 are arranged on only half or one-third the region of the magnetic poles 2b, or a plurality of coils 3 are arranged at intervals in the circumferential direction. When the coils 3 are arranged ununiformly, the load torque imparted to the permanent magnet 2 is large at rotational positions where the magnetic coupling between the coil 3 and the permanent magnet 2 is strong, and the load torque imparted to the permanent magnet 2 is small at rotational positions where the magnetic coupling between the coil 3 and the permanent magnet 2 is weak. That is, the load torque imparted to the permanent magnet 2 can be controlled for each rotational position. Controlling the load torque for each rotational position of the permanent magnet 2 makes it possible to reduce the reluctance force produced in the rotational direction of the permanent magnet 2.

The induced electromotive force E produced in the coils 3 can be obtained as follows. With number of turns "n" in a coil 3, magnetic flux $\varphi$ (Wb) linked with the coil 3, maximum value of magnetic flux $\varphi$max, frequency f (Hz) at which magnetic flux $\varphi$ is changed, and angular frequency $\omega = 2\pi f$, the magnetic flux $\varphi$ can be obtained by Formula (1) below.

$$\varphi = \varphi\text{max} \times \sin \omega t \quad (1)$$

The voltage e (V) induced in the coil 3 is expressed by Formula (2) below.

$$e = -n(d\varphi/dt) \quad (2)$$

Substitution of Formula (1) into Formula (2) results in Formula (3) below.

$$e = -n\omega\varphi\text{max} \cos \omega t \quad (3)$$

Formula (3) contains $n\omega\varphi$max that represents the maximum value (the amplitude) of the induced voltage e. The effective value E of a voltage is expressed by Formula (4) below.

$$E = n(2\pi f)\varphi\text{max}/\sqrt{2} \quad (4)$$

In Formula (4), $2\pi/\sqrt{2} \approx 4.44$. Therefore, Formula (4) can be expressed by Formula (5) below.

$$E \approx 4.44 f n \varphi\text{max} \quad (5)$$

The frequency f of Formula (5) depends on the rotational speed of the permanent magnet 2. Therefore, as is understood from Formula (5), the induced electromotive force E produced by the coils 3 is proportional to a multiplication of the rotational speed of the permanent magnet 2, the number of turns "n" in the coils 3, and the magnetic flux $\varphi$ linked with the coils 3.

Since the rotational speed of the permanent magnet 2 depends on the eddy currents occurring on the side surface Sc of the rotating body 5, it is desirable that as many eddy currents as possible are produced on the side surface Sc of the rotating body 5 to contribute to the rotation of the permanent magnet 2. To this end, the interval between the side surface 2d of the permanent magnet 2 and the side surface Sc of the rotating body 5 should desirably be as small as possible. However, if the interval is too small, there is a risk that the rotating body 5 contacts the permanent magnet 2 when the rotating body 5 is displaced along the extension of the rotational shaft thereof for some reason. Thus, the interval should desirably be set based on the trade-off between the rotational speed and the risk of contact.

Figure 8:
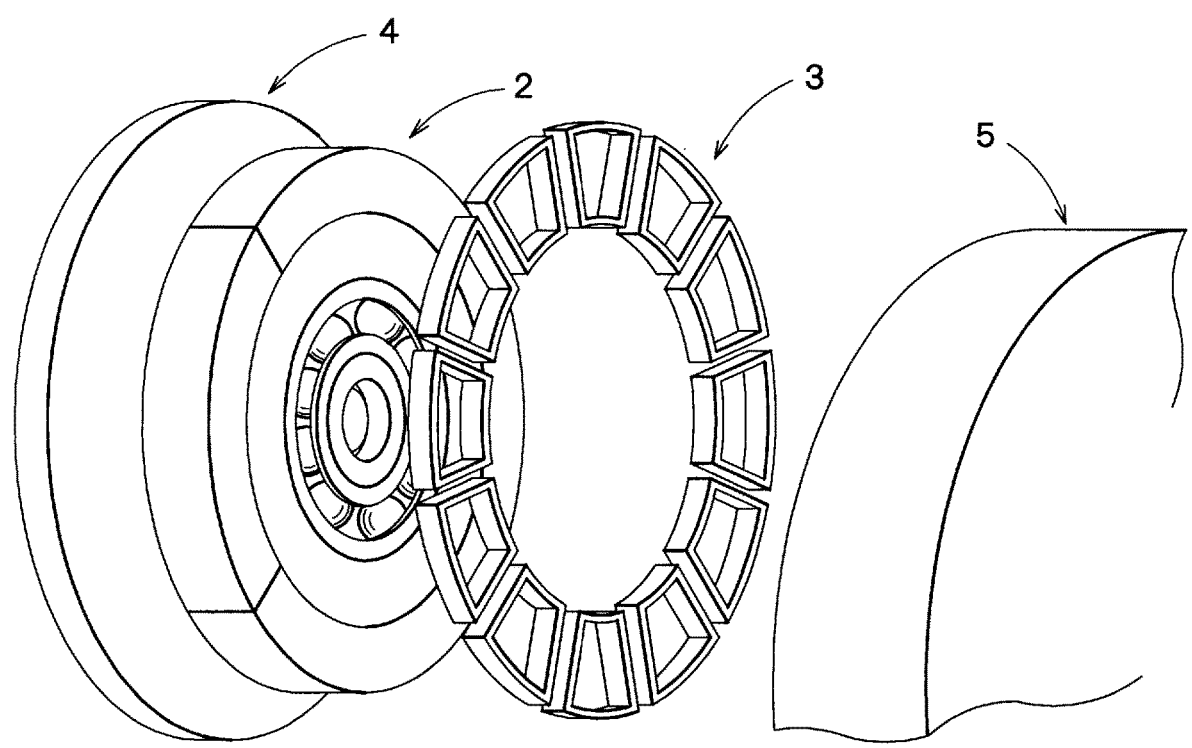
FIG. 8 is an exploded perspective view in which the positions of the permanent magnet and the coils are interchanged.

FIG. 7 shows the permanent magnet 2, the coils 3, and the yoke 4 arranged sequentially from the rotating body 5. It may also be possible that these elements are arranged in the order of the coils 3, the permanent magnet 2, and the yoke 4 from the rotating body 5, as shown in FIG. 8.

The coils 3 typically include a wire wound for a plurality of turns, but it may also be possible that the coils 3 are formed on a printing substrate with a conductive pattern to have a planar shape. The coils 3 having a planar shape can have a reduced size and weight and can be fabricated at reduced costs.

Figure 9A:
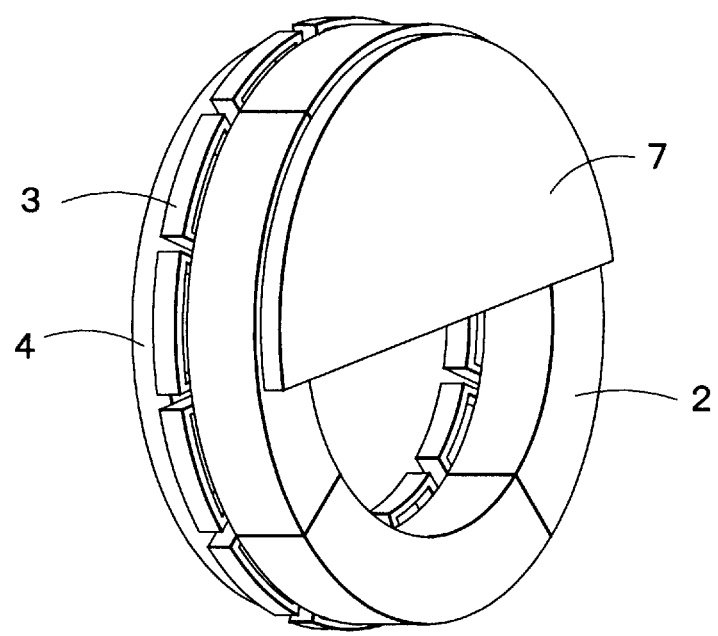
FIG. 9A is a perspective view in which yokes are disposed on both side surfaces of the coils so as to be opposed to each other.
Figure 9B:
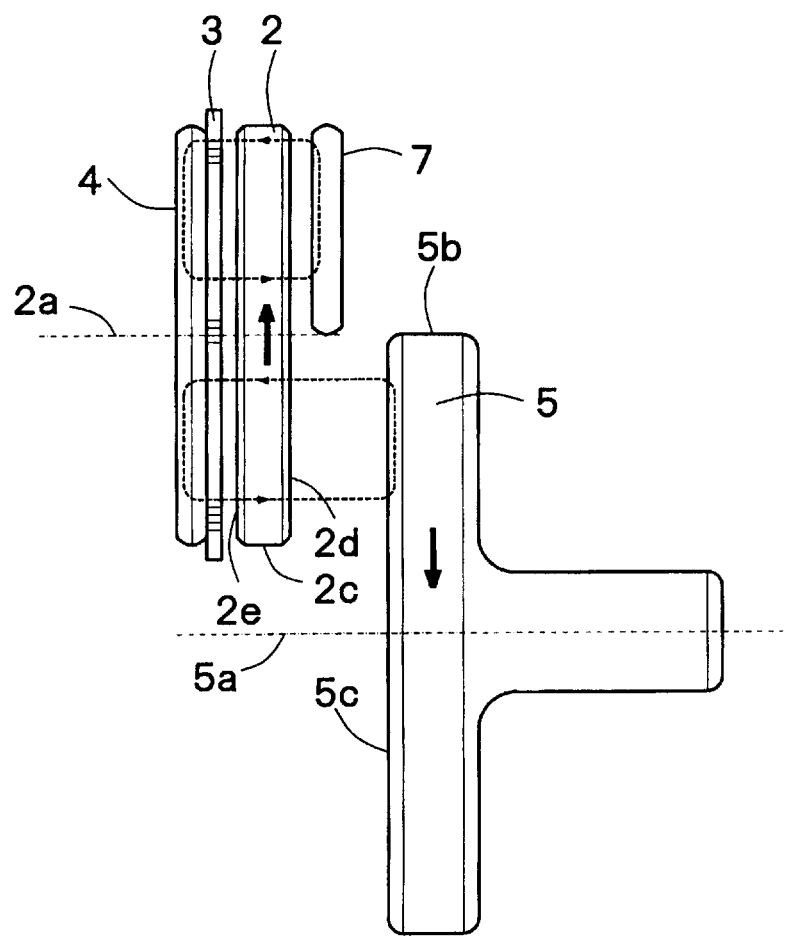
FIG. 9B is a front view in which yokes are disposed on both side surfaces of the coils so as to be opposed to each other.

FIG. 1 and other drawings show that the yoke 4 is disposed on only one of the side surfaces of the coils 3 so as to be opposed to the coils 3, but as shown in FIGS. 9A and 9B, it may also be possible that yokes 4, 7 are disposed on both side surfaces of the coils 3 so as to be opposed to the coils 3. FIG. 9A is a perspective view, and FIG. 9B is a front view.

In FIGS. 9A and 9B, the yoke 7 is disposed on the side surface 2d of the permanent magnet 2 on the rotating body 5 side at a portion not opposed to the rotating body 5. The yoke 7 will be hereinafter referred to as a front yoke (a second magnetic flux guide member) 7, and the yoke (a first magnetic flux guide member) 4 shown in FIG. 1 and other drawings will be hereinafter referred to as a back yoke 4 or a main yoke 4.

As shown in FIG. 9A, the front yoke 7 is shaped to cover the upper half of the profile of the side surface 2d of the permanent magnet 2. The magnetic flux from the upper half of the permanent magnet 2 runs in a magnetic path passing the coils 3, the back yoke 4, the coils 3, the permanent magnet 2, and the front yoke 7 and returning to the permanent magnet 2 or in a magnetic path passing the front yoke 7, the permanent magnet 2, the coils 3, the back yoke 4, and the coils 3 and returning to the permanent magnet 2.

The front yoke 7 reduces the magnetic resistance of the upper half of the permanent magnet 2 and increases the induced electromotive force in the coils 3. The front yoke 7 also prevents the risk that the leaked magnetic flux from the upper half of the permanent magnet 2 prevents occurrence of the eddy currents on the side surface Sc of the rotating body 5. Thus, the front yoke 7 serves to increase the induced electromotive force and also serves as a magnetic shield.

To further increase the induced electromotive force at the upper half of the permanent magnet 2, another coil having almost the same size as the front yoke 7 may be disposed between the permanent magnet 2 and the front yoke 7.

In FIGS. 9A and 9B, the front yoke 7 does not extend to the region where the permanent magnet 2 and the rotating body 5 are opposed to each other. In this configuration, depending on the condition, a braking force may act on a edge of the region where the permanent magnet 2 and the rotating body 5 are opposed to each other, and the braking force hinders rotation of the permanent magnet 2. Therefore, this configuration is undesirable in extracting kinetic energy. Therefore, the front yoke 7 may extend to the edge of the region where the permanent magnet 2 and the rotating body 5 are opposed to each other such that the front yoke 7 extends to a part (the edge in particular) of the region where the permanent magnet 2 and the rotating body 5 are opposed to each other. Thus, the front yoke 7 is not necessarily disposed only in the region where the permanent magnet 2 and the rotating body 5 are not opposed to each other.

Figure 9C:
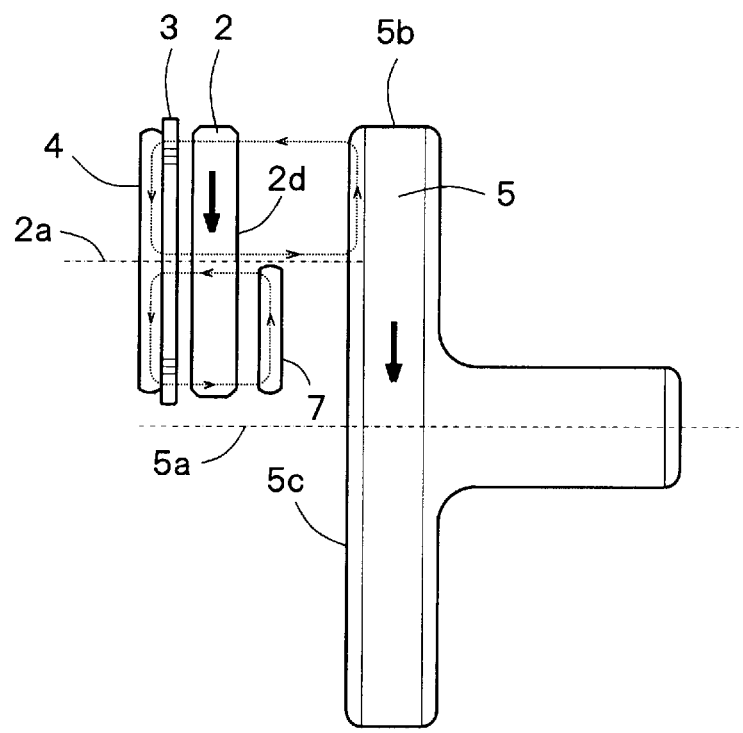
FIG. 9C is a front view in which the position of the front yoke is changed from that in FIG. 9B.

FIG. 9C shows an example in which the permanent magnet 2 is disposed such that the entirety of the side surface 2d thereof is opposed to a semicircle of the side surface Sc of the rotating body 5, and the front yoke 7 is disposed below the rotational shaft 2a of the permanent magnet 2. In FIG. 9C, the magnetic flux running from the permanent magnet 2 through the front yoke 7 does not reach the rotating body 5, but the magnetic flux from the upper half region of the permanent magnet 2 where the front yoke 7 is not disposed reaches the rotating body 5 to contribute to occurrence of the eddy currents. In this case, the permanent magnet 2 rotates in the same direction as the rotating body 5, and therefore, the configuration in FIG. 9C is superior to that of FIG. 9B in terms of rotational torque. However, since the front yoke 7 is disposed in a gap between the permanent magnet 2 and the rotating body 5, the configuration in FIG. 9B is superior in terms of shortening the gap.

Further, when the front yoke 7 is not used, the reaction force produced by the eddy currents is larger in the portion close to the outer periphery of the rotating body 5 than in the portion close to the center thereof, and therefore, the permanent magnet 2 can rotate such that the surface opposed to the outer periphery of the rotating body 5 moves in the same direction as the outer periphery of the rotating body 5.

In FIG. 1 and other drawings, the back yoke 4 tightly attached to the coils 3 has a disk-like or cylindrical shape in conformity to the outer shape of the permanent magnet 2. It may also be possible to optimize the shape of the back yoke 4 so as to reduce the reluctance force occurring in the rotational direction of the permanent magnet 2. That is, the back yoke 4 does not necessarily have a shape in conformity to the outer shape of the permanent magnet 2. Optimizing the shape of the back yoke 4 eliminates the risk that the reluctance force becomes larger than the torque produced by the eddy currents and prevents rotation of the permanent magnet 2.

Further, another permanent magnet may be fixed on the back yoke 4 to control the strength of the magnetic flux at a desired position in the back yoke 4. With such a permanent magnet, it is possible to increase the amount of generated power and minimize the reluctance force occurring in the rotational direction.

In FIGS. 1 to 9B described above, the side surface Sc of the rotating body 5 is opposed at a distance to the side surface 2d of the permanent magnet 2. The embodiment can also be applied to the case where a moving body is substituted for the rotating body 5.

Figure 10:
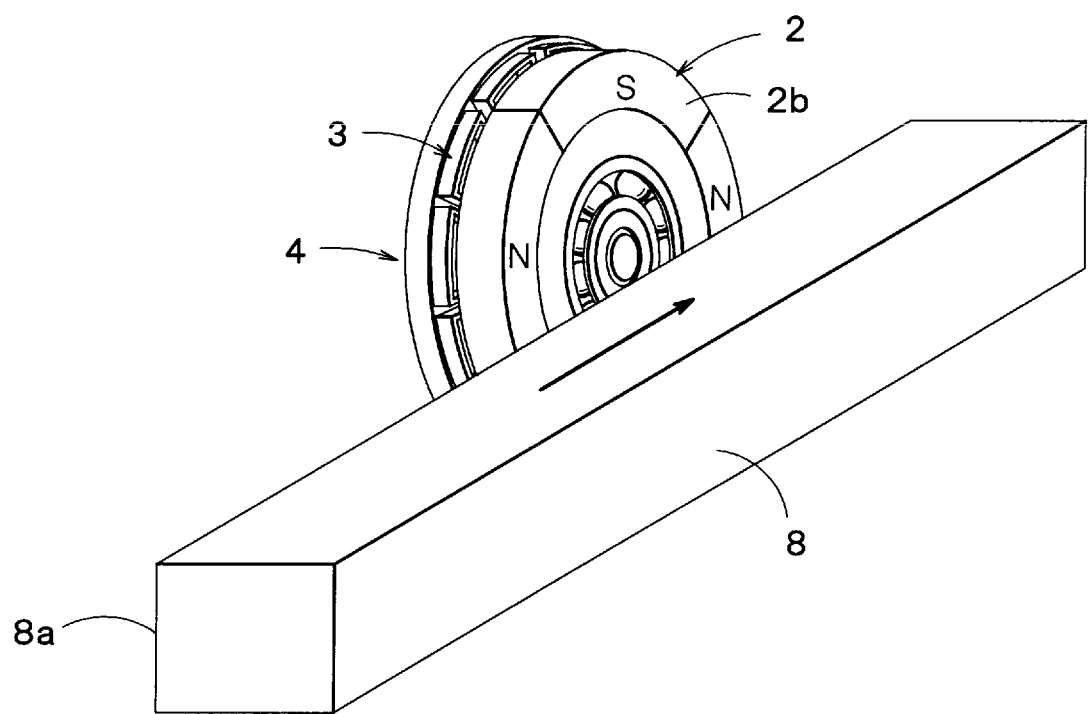
FIG. 10 is a front view of the non-contact power generator including a moving body instead of the rotating body.

FIG. 10 is a front view of the non-contact power generator 1 including a moving body 8 instead of the rotating body 5. A main surface 8a of the moving body 8 is disposed at a distance from the side surface 2d of the permanent magnet. For example, the moving body 8 moves in the direction indicated by the arrow in FIG. 10. Alternatively, the moving body 8 may move in both the direction of the arrow and the direction opposite thereto. At least the main surface 8a of the moving body 8 is formed of an electrically conductive material that produces eddy currents.

The principle of operation in FIG. 10 is the same as in FIG. 5. The eddy currents occur in the main surface 8a of the moving body 8 opposed to the side surface 2d of the permanent magnet 2, in such a direction as to hinder a change of the magnetic flux from the permanent magnet 2. The permanent magnet is rotated in the direction corresponding to the moving direction of the moving body 8 by the interaction (the repulsive force and the attractive force) between the magnetic flux produced by the eddy currents and the magnetic flux from the permanent magnet 2.

The moving body 8 may either moves by itself or moves relative to the permanent magnet 2. For example, the embodiment can be applied to the case where the moving body 8 is a rail for running of a train, the train includes the permanent magnet 2 disposed rotatably and the coils 3 and yoke 4 fixed and runs on the rail, and the side surface 2d of the permanent magnet 2 is opposed to a side surface of the rail. Thus, the moving body 8 may move relative to the permanent magnet 2.

Figure 11:
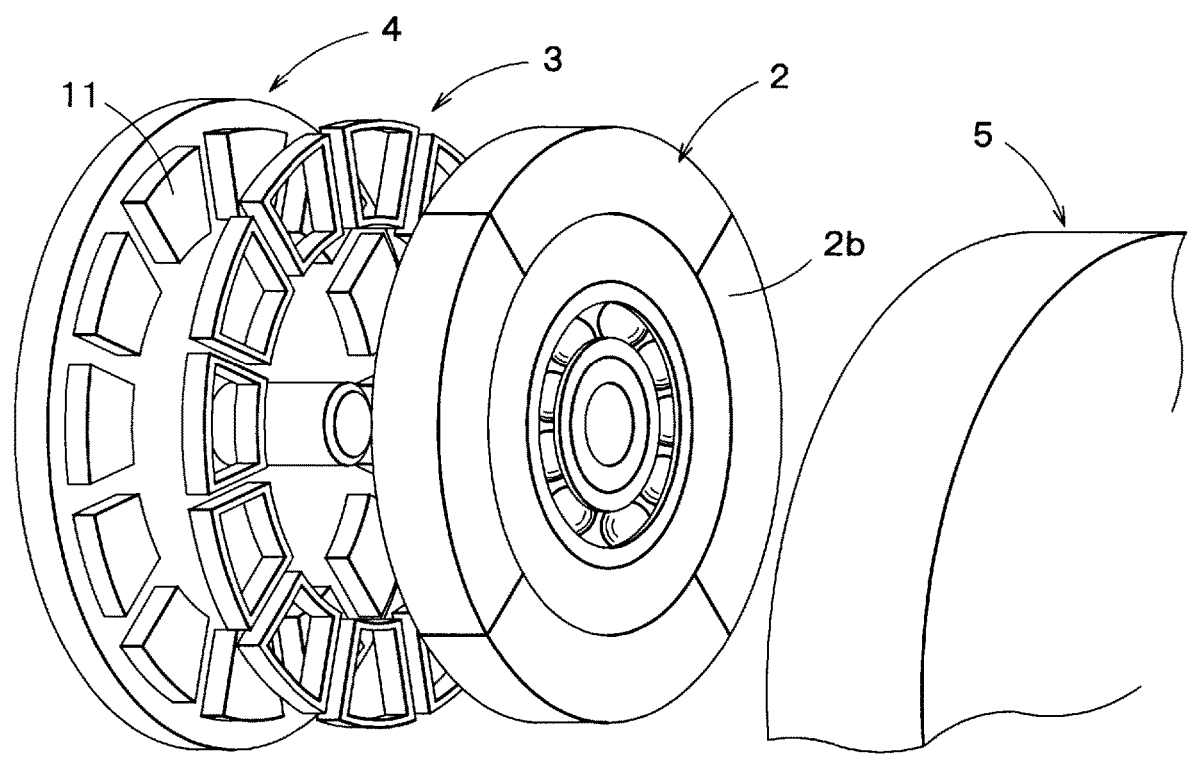
FIG. 11 is an exploded perspective view in which teeth are inserted into the coils.

As expressed in Formula (5) above, the induced electromotive force E is larger as the magnetic flux $\varphi$ linked with the coils 3 is larger. One way to increase the magnetic density $\varphi$ without changing the number of turns in the coils 3 is to insert a core member 11 made of a laminated steel plate into the coils 3. FIG. 11 shows an example in which teeth (core members) 11 having a convex shape and configured to be inserted into the coils 3 are integrated with the yoke 4 (the back yoke 4) tightly attached to the coils 3. The teeth 11 may be integrated with the yoke 4, and the teeth 11 and the yoke 4 may be formed of a material having a high magnetic permeability such as a laminated steel plate.

Figure 12:
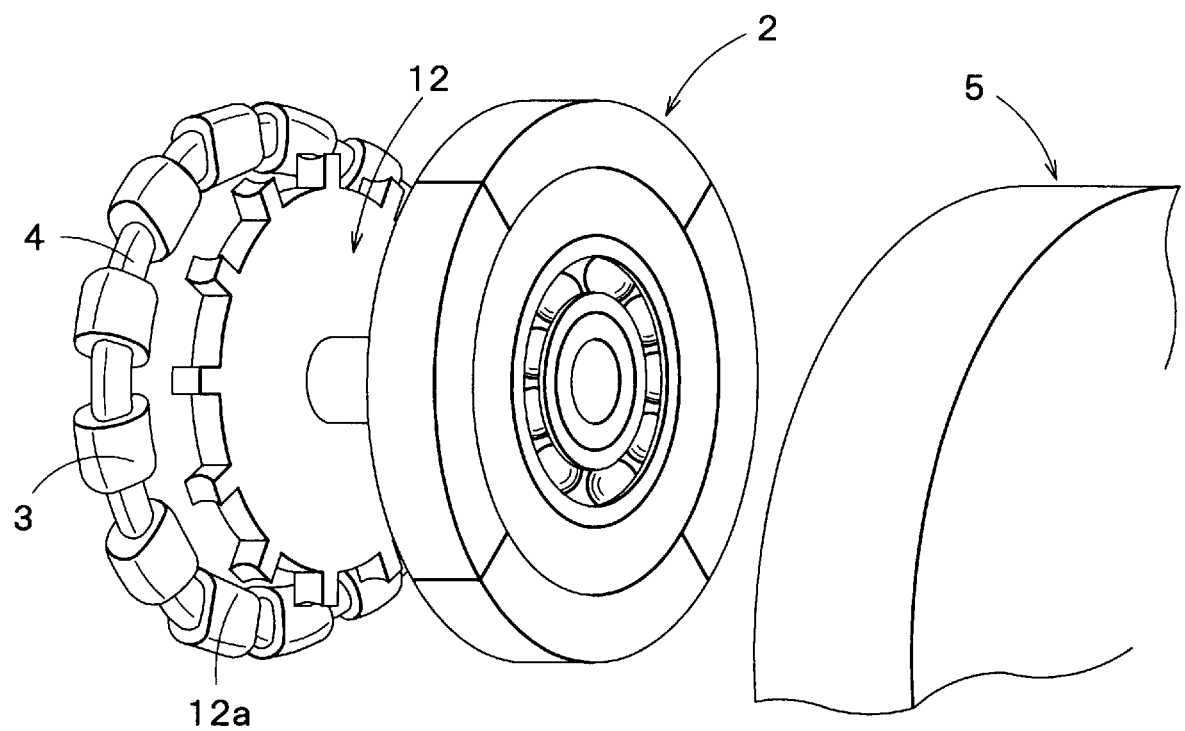
FIG. 12 is an exploded perspective view in which a plurality of coils 3 are wound on the yoke 4 having an annular shape.

Further, it is also possible that the yoke 4 is integrated with the coils 3. For example, FIG. 12 shows that a plurality of coils 3 are wound on the yoke 4 having an annular shape. A carrier 12 having a tabular shape and made of a material having a low magnetic permeability is arranged on the inner peripheral side of the yoke 4 so as to prevent rotation of the yoke 4 having an annular shape, and the coils 3 are fixed with projections 12a on the outer peripheral surface of the carrier 12.

Thus, the coils 3 and the yoke 4 may have various shapes, and the coils 3 and the yoke 4 applicable to the embodiment are not limited to those described above.

Figure 13:
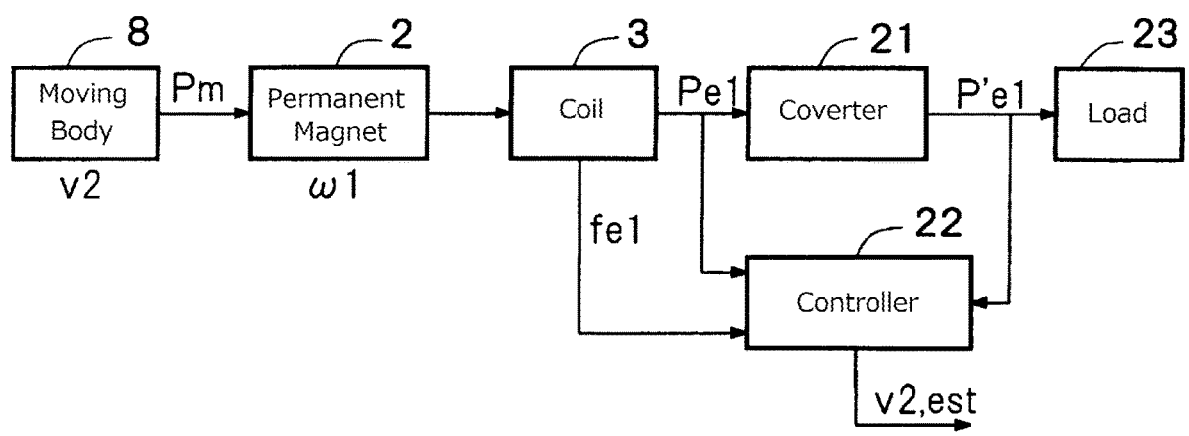
FIG. 13 is a function block diagram of a control system of the non-contact power generator 1.

FIG. 13 is a function block diagram of a control system of the non-contact power generator 1 according to the embodiment. In the function block diagram shown in FIG. 13, the moving body 8 refers collectively to the rotating body 5 as in FIG. 1 and the moving body 8 as in FIG. 10. As shown in FIG. 13, the control system of the non-contact power generator 1 according to the embodiment includes a moving body 8 that rotates or moves, a permanent magnet 2 disposed rotatably, coils 3, a converter 21, and a controller 22. The converter 21 can be connected to various loads 23.

As described above, the moving body 8 moves relative to the permanent magnet 2, thereby to produce eddy currents in the main surface opposed to the permanent magnet 2. This means that a part of kinetic energy of the moving body 8 is converted into magnetic energy.

The permanent magnet 2 extracts kinetic energy from the moving body 8 through magnetic interaction between the magnetic flux from the permanent magnet 2 and the magnetic flux produced by the eddy currents. The rotational speed ω1 of the permanent magnet 2 depends on the surface speed v2 of the side surface of the moving body 8.

The coils 3 converts the kinetic energy of the permanent magnet 2 into electric energy when the magnetic flux from the permanent magnet 2 is linked with the coils 3. The induced electromotive force frequency fe1 of the coils 3 depends on the rotational speed ω1 of the permanent magnet 2. The number of coils 3 and the number of magnetic poles 2b in the permanent magnet 2 impact the rotational speed ω1 of the permanent magnet 2 and the induced electromotive force frequency fe1 of the coils 3.

The converter 21 performs power conversion of electric energy. The converter 21 may be an AC/DC converter for converting alternating voltage to direct voltage or may simply be a rectifier. The output power of the converter 21 is supplied to the controller 22 and is also used for driving the load 23.

The controller 22 monitors at least one of the output power P'e1 of the converter 21, the induced electromotive force Pe1 of the coils 3, and the frequency fe1 thereby to control the converter 21. The controller 22 also estimates the rotational speed or the moving speed of the moving body 8 based on the induced electromotive force frequency fe1 of the coils 3. Alternatively, the controller 22 estimates the rotational speed or the moving speed of the moving body 8 based on at least one of the induced electromotive force frequency fe1 of the coils 3, the output power P'e1 of the converter 21, and the output voltage Pe1 of the coils 3.

Since there is a difference caused by sliding between the surface speed v2 of the side surface of the moving body 8 and the rotational speed ω1 of the permanent magnet 2, the controller 22 performs estimation while compensating the difference in speed.

When the load 23 is driven by the output power P'e1 of the converter 21, the amount of sliding varies depending on the type of the load 23. Typically, the amount of sliding is smaller as the load 23 is smaller, and the mount of sliding is larger as the load 23 is larger.

In addition, the controller 22 may store history (log) information such as the estimated rotational speed or moving speed of the moving body 8, the peak value of the amount of generated power, and the average of the amount of generated power.

Thus, when the moving body 8 is a vehicle, the induced power generated by the non-contact power generator 1 according to the embodiment can be used as a power source for electric instruments of the vehicle. With a moving body having electrical conductivity other than a vehicle, it is possible to generate power in the vicinity of the moving body and supply the power to various electric instruments without need of wiring from a power source.

When the permanent magnet 2 rotates relative to the moving body 8 as in the embodiment, a reluctance force occurs based on asymmetry of the distance between the permanent magnet 2 and the moving body 8. The reluctance force produces cogging torque. Since cogging torque leads to variation of the rotational speed of the permanent magnet 2 and increase of starting torque, it is desirable to minimize the cogging torque. The cogging torque Tcog is expressed by Formula (6) below.

$$T_{cog} = -\frac{\partial W_{mag}}{\partial \theta} \quad (6)$$

In Formula (6), Wmag is magnetic energy, and θ is a rotational angle of the permanent magnet 2.

As described above, in the embodiment, the kinetic energy based on the rotation (movement) of the rotating body 5 (moving body 8) is extracted by the permanent magnet 2, and the kinetic energy is converted to electric energy by the coils 3. Ignoring the mechanical loss of bearings provided around the rotational shaft and air resistance, the power balance in the embodiment is expressed by Formula (7) below.

$$P_2 - P_{LM} + P_1 = 0 \quad (7)$$

$P_2$ is a braking force that acts on the rotating body 5 (the moving body 8). When $P_2$ is positive, the braking force is acting on the surface of the rotating body 5 (moving body 8), that is, a force is acting in such a direction as to reduce the rotational (moving) speed. When $P_2$ is negative, a force is acting in such a direction as to increase the rotational (moving) speed of the rotating body 5 (moving body 8). When kinetic energy is extracted from the rotating body 5 (moving body 8), $P_2$ is positive. When $P_2$ is positive, the surface speed of the surface of the rotating body (moving body 8) is higher than that of the surface of the permanent magnet 2 opposed thereto. When $P_2$ is negative, the surface speed of the surface of the rotating body (moving body 8) is lower than that of the surface of the permanent magnet 2 opposed thereto. Irrespective of whether $P_2$ is positive or negative, the permanent magnet 2 moves in the same direction as the rotating body 5 (the moving body 8).

$P_{LM}$ is an electromagnetic loss in the rotating body 5 (moving body 8), and more specifically, a loss caused by eddy currents, hysteresis, and so on. $P_{LM}$ is positive all the time.

$P_1$ is an extracted mechanical force and is also the above-described kinetic energy for rotating the permanent magnet 2. The kinetic energy for rotating the permanent magnet 2 has a negative value. $P_1$ is expressed by Formula (8) below.

$$P_1 = \omega_{MW} \times T_{MW} \quad (8)$$

In Formula (8), $\omega_{MW}$ is the rotational speed of the permanent magnet 2, and $T_{MW}$ is the torque of the permanent magnet 2. $P_1$ is also expressed by Formula (9) below.

$$P_{EL} = P_{GL} + P_1 \quad (9)$$

$P_{EL}$ is extracted power. When the kinetic energy is extracted at the permanent magnet 2, $P_{EL}$ is negative. $P_{GL}$ is a loss of the power generator such as the copper loss of the coils 3. $P_{GL}$ is positive all the time.

Variations of First Embodiment

In FIG. 1, one permanent magnet 2 is provided for one rotating body 5. It may also be possible that a plurality of permanent magnets 2 are provided for one rotating body 5 (moving body 8). The plurality of permanent magnets 2 may have the same size and shape, or at least a part of the plurality of permanent magnets 2 may have a different size and shape.

For example, a permanent magnet 2 having a small diameter can be used to assist starting of rotation of a permanent magnet 2 having a large diameter. More specifically, when a permanent magnet 2 having a large diameter and a permanent magnet 2 having a small diameter are disposed closely to the main surface of one rotating body 5, the permanent magnet 2 having a large diameter requires larger torque to start rotating than the permanent magnet 2 having a small diameter. Therefore, when the rotating body 5 (moving body 8) is operating at a low speed, it is possible that the permanent magnet 2 having a small diameter rotates, whereas the permanent magnet 2 having a large diameter does not rotate. Therefore, for example, a motor that serves as a power generator may be connected at each of rotational axes of the permanent magnet 2 having a large diameter and the permanent magnet 2 having a small diameter, such that the power generated by the power generator connected to the rotational shaft of the permanent magnet 2 having a small diameter which starts first is used as a drive power source for the motor connected to the rotational shaft of the permanent magnet 2 having a large diameter, thereby to provide starting torque to the permanent magnet 2 having a large diameter. Thus, the permanent magnet 2 having a large diameter can be rotated for power generation during low speed operation. The non-contact power generator shown in FIG. 1 can also operate as a motor and thus can be used in the same manner.

There is an optimal size for the permanent magnet 2 used in the non-contact power generator of the embodiment. When an induced electromotive force larger than that obtained by the permanent magnet 2 having an optimal size is required, and a larger permanent magnet 2 is used to obtain the required induced electromotive force, the whole size of the non-contact power generator may be extremely large. Therefore, it may be preferable to provide a plurality of permanent magnets 2 having the optimal size to obtain the required induced electromotive force while keeping the whole size of the non-contact power generator small, instead of using a permanent magnet 2 having a larger size.

At least the side surface (the main surface) of the rotating body 5 (moving body 8) needs to be formed of an electrically conductive material (steel, aluminum, copper, etc.) suited for occurrence of eddy currents. It may be possible that the base material of the rotating body 5 (moving body 8) is an insulating material such as resin or plastic, and the electrically conductive material is joined to the surface of the base material.

FIG. 1 and other drawings show an example in which the permanent magnet 2 includes a plurality of magnetic poles 2b. It may also be possible that the permanent magnet 2 is configured such that irrespective of the rotational position thereof, magnetic poles having the same polarity face the opposed surface of the rotating body 5 (moving body 8) at all time. That is, when there is magnetic flux running from the permanent magnet 2 toward the side surface (the main surface) of the rotating body 5 (moving body 8), eddy currents occur on a region of the side surface (the main surface) opposed to the permanent magnet 2, and the permanent magnet 2 can be rotated by the interaction (the repulsive force and the attractive force) between the magnetic flux produced by the eddy currents and the magnetic flux from the permanent magnet 2. In this case, since the permanent magnet has only a single polarity, alternating magnetic flux cannot be obtained even when the coils 3 are disposed around the permanent magnet 2. Therefore, the coils 3 cannot produce induced power directly. However, it is possible to drive a drive body such as a motor mounted on the rotational shaft of the permanent magnet 2.

In the above example, the permanent magnet 2 is rotated in accordance with the rotation (movement) of the rotating body 5 (moving body 8). Conversely, it may also be possible that the permanent magnet 2 is rotated to produce eddy currents on the side surface (the main surface) of the rotating body 5 (moving body 8) in accordance with the rotation of the permanent magnet 2, and the rotating body 5 (moving body 8) is rotated (moved) by the interaction (the repulsive force and the attractive force) between the magnetic flux from the permanent magnet 2 and the magnetic flux produced by the eddy currents. That is, kinetic force may be supplied to the rotating body 5 (moving body 8).

Thus, in the first embodiment, there is provided the permanent magnet 2 which is rotatable around the first rotational shaft 2a and disposed at a distance from the moving body 8 rotating or moving, and at least a part of the side surface 2d which is continuous to the outer peripheral surface 2c is opposed to the main surface 8a of the moving body 8 (e.g., the side surface Sc of the rotating body 5). Therefore, eddy currents can be produced by the magnetic flux from the permanent magnet 2 in the main surface 8a of the moving body 8 in such a direction as to hinder a change of the magnetic flux. The permanent magnet 2 is rotated around the first rotational shaft 2a by the interaction (the repulsive force and the attractive force) between the magnetic flux produced by the eddy currents and the magnetic flux from the permanent magnet 2. The permanent magnet 2 rotates in a direction corresponding to the rotational or moving direction of the moving body 8.

The first embodiment serves to overcome the problems of the conventional non-contact power generator 1 disclosed in the publication described above. That is, in the embodiment, a large portion of the side surface 2d of the permanent magnet 2 can be opposed to the main surface of the moving body 8, and therefore, large eddy currents occur in the main surface of the moving body 8, the interaction (the repulsive force and the attractive force) between the magnetic flux produced by the eddy currents and the magnetic flux from the permanent magnet 2 can be enhanced, and the rotational force of the permanent magnet 2 can be higher than in the conventional non-contact power generator.

In addition, in the embodiment, one or more coils 3 are provided for each of the plurality of magnetic poles 2b of the permanent magnet 2 disposed circumferentially. Therefore, the magnetic flux from the permanent magnet 2 can be linked with the coils 3 without leakage, resulting in higher magnetic efficiency.

Further, in the embodiment, the coils 3 are disposed closely to the permanent magnet 2, and the yoke 4 is tightly attached to the coils 3. Therefore, the magnetic resistance can be reduced and the magnetic efficiency can be increased. The yoke 4 can be disposed on both sides of the permanent magnet 2 as necessary, thereby to prevent the leaked magnetic flux from adversely affecting the electrically conductive material in the perimeter and prevent the leaked magnetic flux from adversely affecting the occurrence of the eddy currents.

FIGS. 1 to 13 show the non-contact power generator 1 including the coils 3 and the yoke 4, but the yoke 4 can be omitted if a small amount of leakage of magnetic flux or increase of magnetic resistance is allowable. Further, the coils 3 can also be omitted if it is aimed to rotate the permanent magnet 2 and the induced power is not necessary. Therefore, the embodiment can be applied to a rotary electric machine not including the yoke 4 and a rotary electric machine not including the coils 3 and the yoke 4.

Second Embodiment

The second embodiment includes a drive body to be driven by the rotational force of the permanent magnet 2.

Figure 14A:
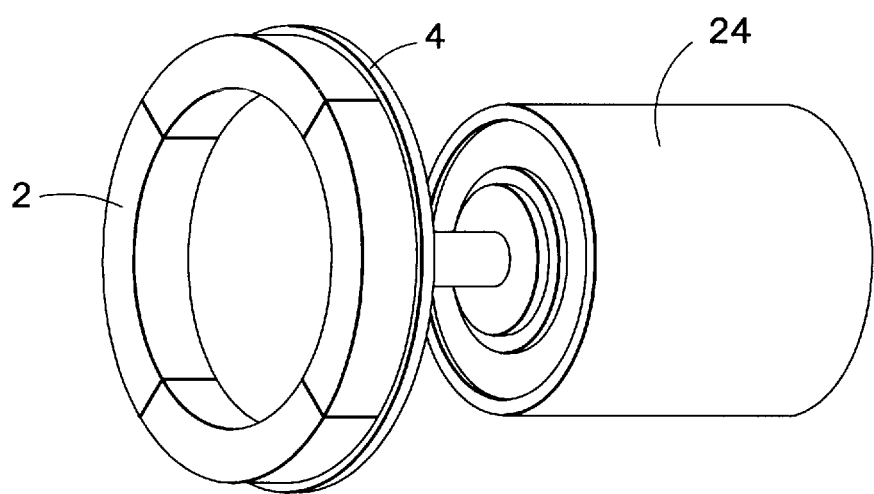
FIG. 14A is a perspective view of a rotary electric machine according to a second embodiment of the present disclosure.
Figure 14B:
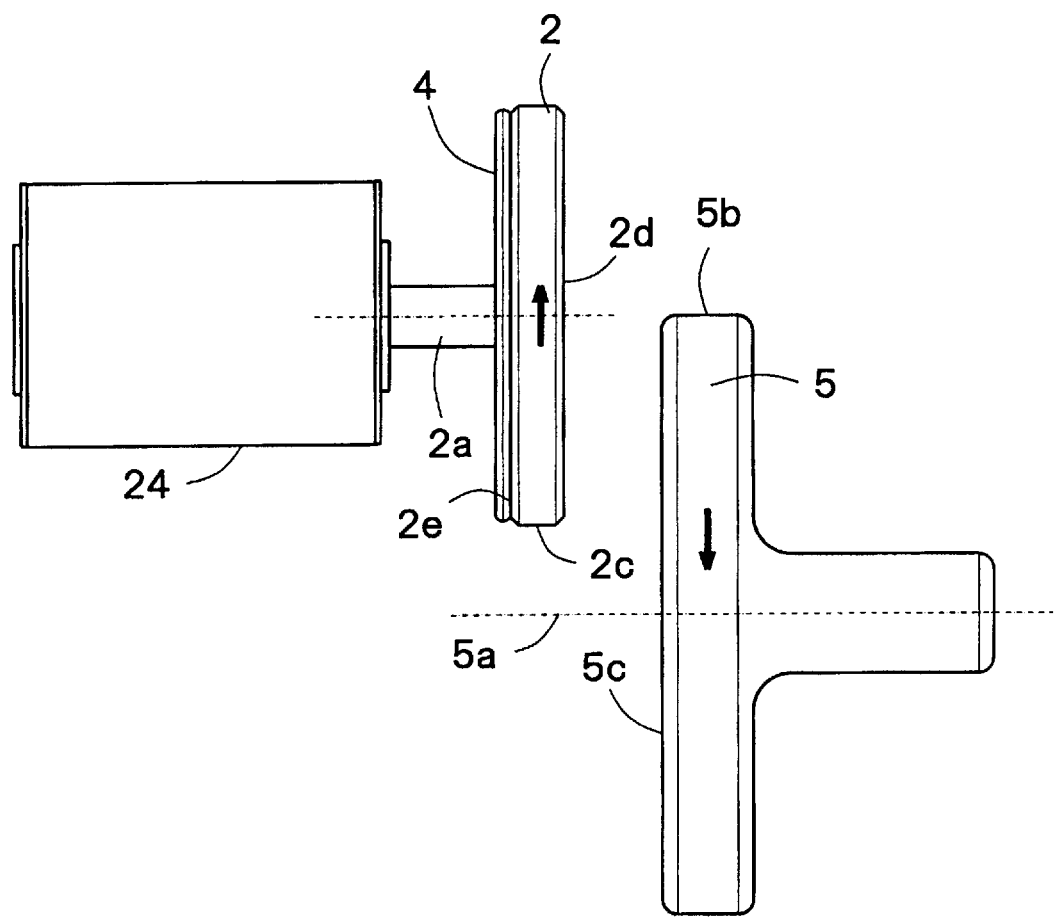
FIG. 14B is a front view of the rotary electric machine according to the second embodiment of the present disclosure.

FIG. 14A is a perspective view of a rotary electric machine according to the second embodiment of the present disclosure, and FIG. 14B is a front view of the same. The rotary electric machine of FIG. 14A is constituted by the non-contact power generator 1 of FIG. 1 that includes no coils 3 but includes a standard electric machine 24 connected to the rotational shaft 2a of the permanent magnet 2. The permanent magnet 2 is joined to the yoke 4 which has a tabular shape and is jointed to an end of the rotational shaft 2a. The permanent magnet 2, the yoke 4, and the rotational shaft 2a can rotate integrally.

The standard electric machine 24 is a drive body 24 to be driven using the rotation of the rotation shaft. For example, the drive body 24 includes a rotor (not shown) that rotates together with the rotational shaft 2a, and a stator (not shown). The rotation of the rotor drives the load 23. More specifically, the drive body 24 may be a power generator or a speed reducer. Further, the drive body 24 may be used as a compressor for compressing the air using the rotational force of the rotational shaft. Thus, the drive body 24 may serve either to convert the rotational force of the rotational shaft into electric power or to convert the rotational force of the rotational shaft into a mechanical force.

FIG. 14B shows an example in which the side surface 2d continuous to the outer peripheral surface 2c of the permanent magnet 2 of the rotary electric machine is opposed to the side surface Sc of the rotating body 5, but it may also be possible that the side surface 2d of the permanent magnet 2 is opposed to the main surface of the moving body 8, instead of the rotating body 5.

In the second embodiment, the permanent magnet 2 is used only to extract the kinetic energy from the rotating body 5 (moving body 8), and the kinetic energy generated at the permanent magnet 2 is converted into the electric energy in the standard electric machine 24. Thus, the second embodiment is characterized in that the kinetic energy and the electric energy are generated independently of each other. This simplifies the structure of the main part of the rotary electric machine around the permanent magnet 2.

In the first embodiment, the coils 3 to be linked with the magnetic flux from the permanent magnet 2 are necessary, and it is necessary to consider the size and location of the coils 3. By contrast, in the second embodiment, the kinetic energy generated at the permanent magnet 2 is converted into the electric energy in the standard electric machine 24, and therefore, the structure around the permanent magnet 2 can be significantly simplified rather than in the first embodiment.

That is, the permanent magnet 2 can be designed for generating the kinetic force most efficiently. Likewise, the standard electric machine 24 can be designed for converting the kinetic energy generated by the permanent magnet 2 into the electric energy most efficiently. Thus, the permanent magnet 2 and the standard electric machine 24 can be designed independently of each other, and therefore, simple designing is possible.

In FIG. 14A, the tabular yoke 4 that rotates together with the permanent magnet 2 is tightly attached to the surface of the permanent magnet 2 opposite to the surface opposed to the rotating body 5, and the rotational shaft 2a mounted to the center of the tabular yoke 4 is connected to the standard electric machine 24. It may also be possible to omit the rotational shaft 2a and connect the tabular yoke 4 directly to the standard electric machine 24 such that the rotational force of the permanent magnet 2 is transmitted to the standard electric machine 24 without use of a rotational shaft.

The standard electric machine 24 shown in FIG. 14A and other drawings may be connected to the rotational shaft 2a of the permanent magnet 2 in the first embodiment described above.

Thus, in the second embodiment, the kinetic energy produced by the permanent magnet 2 is transmitted to the standard electric machine 24 that converts the kinetic energy into electric energy, instead of converting the kinetic energy produced by the permanent magnet 2 into electric energy using the magnetic flux of the permanent magnet 2. This configuration facilitates design of a rotary electric machine having optimized kinetic energy and electric energy.

Third Embodiment

Figure 15A:
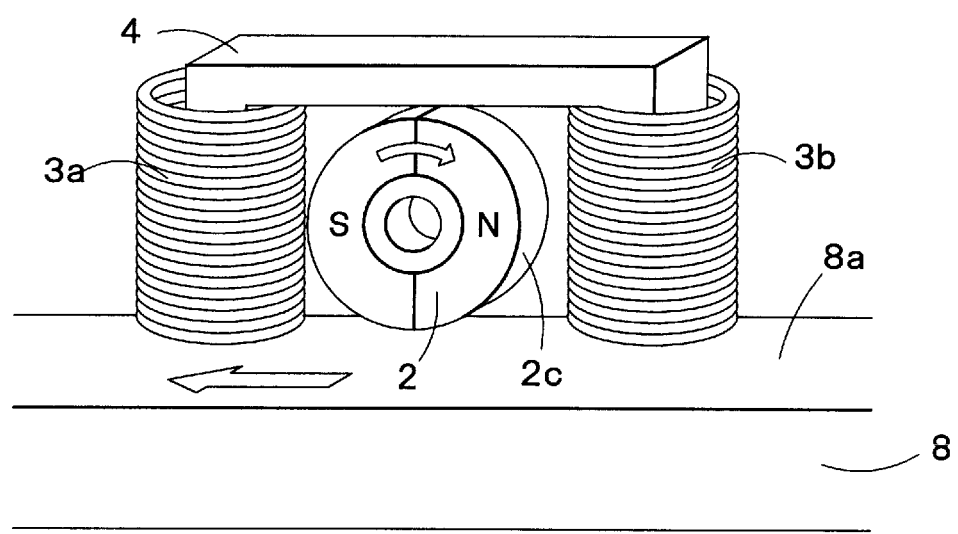
FIG. 15A is an external view of a non-contact power generator 1 according to a third embodiment.

In a third embodiment, the outer peripheral surface of the permanent magnet 2 is opposed to the main surface of the moving body 8. FIG. 15A is an external view of a non-contact power generator 1 according to the third embodiment. The non-contact power generator 1 of FIG. 15A includes a permanent magnet 2 that rotates around a rotational shaft, two coils (a first coil 3a and a second coil 3b), and a yoke 4.

The permanent magnet 2 is opposed at a distance to the main surface 8a of the moving body 8 that rotates or moves. The permanent magnet 2 rotates in accordance with the direction of rotation or movement of the moving body 8. The permanent magnet 2 includes at least two magnetic poles 2b that are magnetized in the direction normal to the outer peripheral surface of the permanent magnet 2.

The outer peripheral surface 2c of the permanent magnet 2 is arranged at a distance from the main surface 8a of the moving body 8, and the permanent magnet 2 is rotatable without contacting the main surface 8a of the moving body 8. In the example shown in FIG. 15A, the first coil 3a among the two coils 3 is positioned on the rear side of the permanent magnet 2 with respect to the direction of rotation or movement of the moving body 8. The second coil 3b among the two coils 3 is positioned on the front side of the permanent magnet 2 with respect to the direction of rotation or movement of the moving body 8. The first and second coils 3a, 3b are arranged at a distance from the main surface 8a of the moving body 8.

Further, in the example shown in FIG. 15A, the yoke 4 having a U-shape extends inside and above the first and second coils 3a, 3b. A gap is provided between the yoke 4 and the permanent magnet 2, as well as between the permanent magnet 2 and the first and second coils 3a, 3b. These gaps are air gaps. Therefore, the permanent magnet 2 rotates in a region surrounded by the main surface of the moving body 8, the first and second coils 3a, 3b, and the yoke 4.

FIG. 15A shows a mere example of arrangement of the coils 3 that should be positioned in regions where all the magnetic flux from the permanent magnet 2 concentrate. Further, the shape of the yoke 4 is not limited to that shown in FIG. 15A.

Figure 15B:
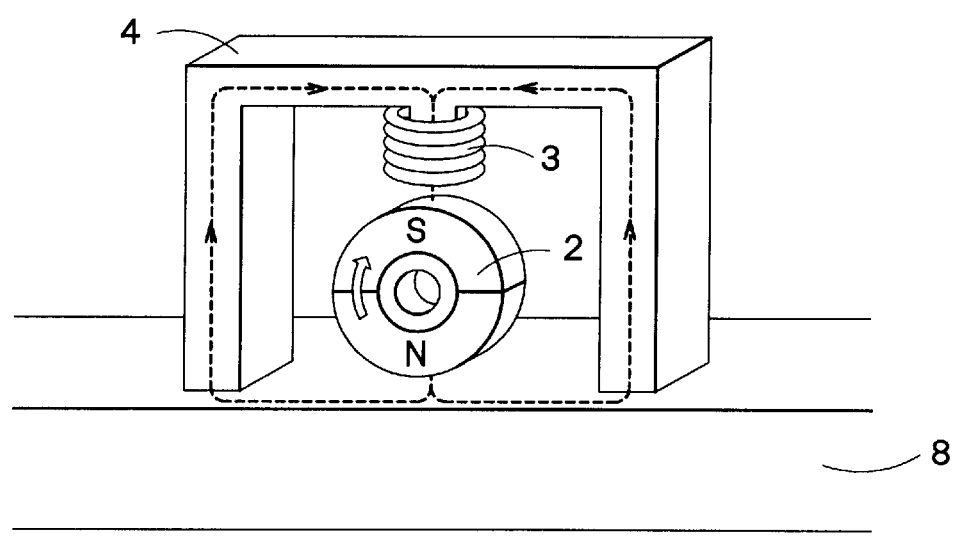
FIG. 15B shows an example in which one coil is used for power generation.

For example, FIG. 15B shows an example in which one coil 3 is used for power generation. The coil 3 is wound around the yoke 4 above the permanent magnet 2. The yoke 4 extends from above the permanent magnet 2 toward both sides in the direction of movement of the moving body 8, so as to surround the permanent magnet 2. Since the coil 3 is linked with almost all the magnetic flux from the permanent magnet 2, it is not necessary to provide a plurality of coils 3. The coil 3 can be arranged at any position where all the magnetic flux from the permanent magnet 2 concentrate (for example, the vicinity of at least one of the N-pole and the S-pole of the permanent magnet 2). Further, the yoke 4 has such a structure that the air gap between the yoke 4 and the moving body 8 in the magnetic path is as small as possible. This structure is not limited to those shown in FIGS. 15A and 15B. For example, the yoke 4 may have a cylindrical or cubic shape.

When the moving body 8 rotates around a rotational shaft, the rotational shaft of the moving body 8 may extend in such a direction as to intersect, or more specifically, cross at right angles the rotational shaft of the permanent magnet 2, or alternatively, the rotational shaft of the moving body 8 may extend in parallel with the rotational shaft of the permanent magnet 2.

In the main surface of the moving body 8 in FIGS. 15A and 15B, eddy currents occur in such a direction as to hinder a change of the magnetic flux from the permanent magnet 2. The permanent magnet is rotated in accordance with the direction of rotation or movement of the moving body 8 by the interaction (the repulsive force and the attractive force) between the magnetic flux produced by the eddy currents and the magnetic flux from the permanent magnet 2. The circumferential speed of the permanent magnet 2 is lower than the surface speed of the main surface of the moving body 8 opposed thereto.

Figure 16:
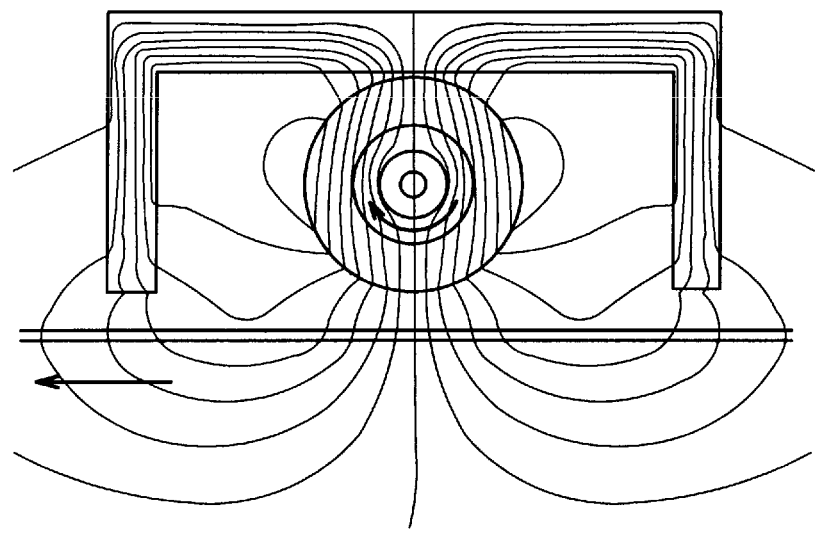
FIG. 16 shows a flow of magnetic flux in the non-contact power generator 1 of FIGS. 15A and 15B.

FIG. 16 shows a flow of magnetic flux in the non-contact power generator 1 of FIGS. 15A and 15B. The magnetic flux from the permanent magnet 2 propagates along the magnetic path passing the moving body 8, the interiors of the first and second coils 3a, 3b, and the yoke 4 and returning to the permanent magnet 2, or propagates along the magnetic path passing the yoke 4, the interiors of the first and second coils 3a, 3b, and the moving body 8 and returning to the permanent magnet 2. As shown in FIG. 16, the magnetic flux running into and out of the permanent magnet 2 passes the yoke 4, and the magnetic flux running into and out of the yoke 4 passes the interiors of the coils 3. Therefore, there is almost no leakage of the magnetic flux running into and out of the permanent magnet 2, the yoke 4, and the coils 3. In addition, the proportion of the air gap in the magnetic path is small, it is possible to reduce the magnetic resistance and increase the magnetic efficiency.

In the non-contact power generator 1 according to the third embodiment, the principle of rotation of the permanent magnet 2 is the same as in the first and second embodiments described above. The advantage of the third embodiment over the first and second embodiments is that the amount of magnetic flux linked with the coils 3 can be increased with only two magnetic poles 2b in the permanent magnet 2. By minimizing the gap between the permanent magnet 2 and the main surface of the moving body 8, the gap between the coils 3 and the main surface of the moving body 8, and the gap between the yoke 4 and the permanent magnet 2, the amount of magnetic flux leaking from the magnetic path can be reduced, and the magnetic resistance can also be reduced, which results in increased magnetic efficiency. Thus, the advantages of the non-contact power generator 1 according to the third embodiment are that the magnetic resistance is reduced by the yoke 4 newly provided and that the number of necessary magnetic poles in the permanent magnet 2 is smaller, as compared to the non-contact power generator disclosed in the publication described above.

In addition, the rotational shaft of the permanent magnet 2 in the third embodiment may be connected to the standard electric machine 24 described for the second embodiment.

Thus, in the third embodiment, the permanent magnet 2 is surrounded closely by the two coils 3, the main surface of the moving body 8, and the yoke 4, and therefore, almost all the magnetic flux from the permanent magnet 2 runs through the coils 3 and the yoke 4, resulting in an increased magnetic efficiency.

Figure 17:
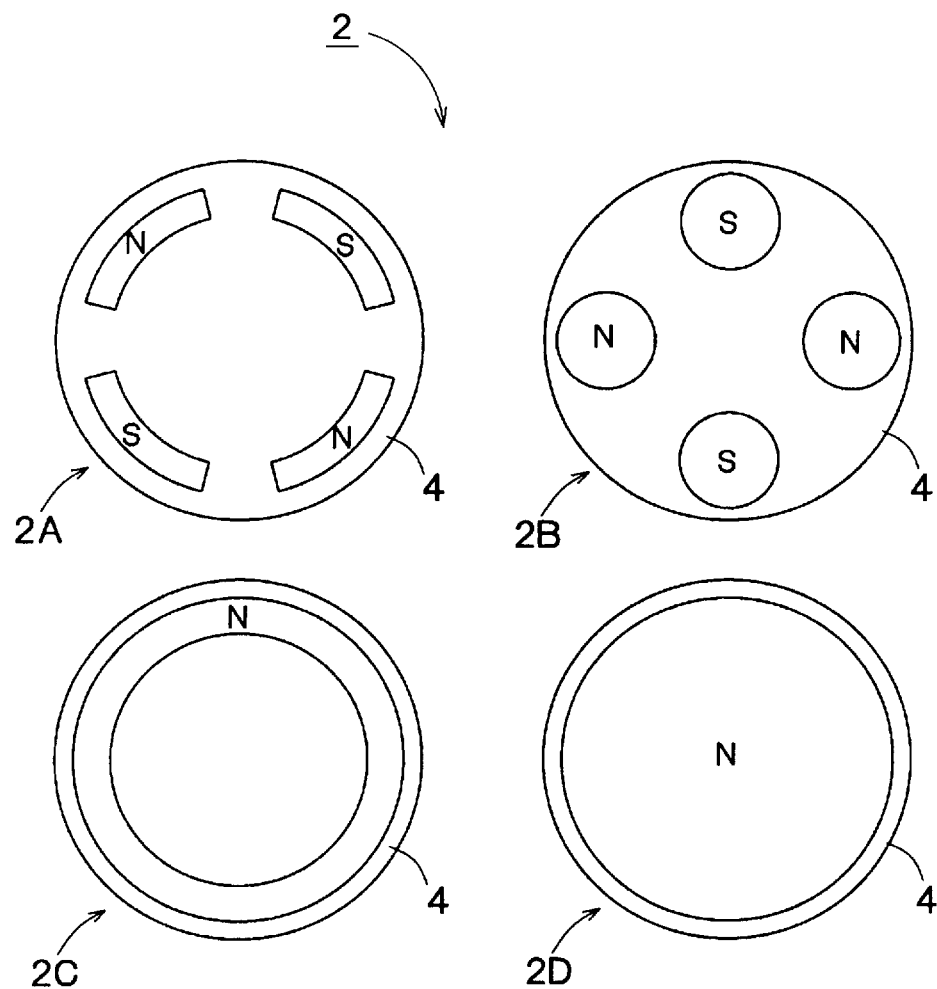
FIG. 17 is a plan view showing representative variations of the permanent magnet.

The arrangement of the magnetic poles of the permanent magnet 2 used in the first to third embodiments is not limited to those shown in FIG. 4 and other drawings. FIG. 17 is a plan view showing representative variations of the permanent magnet 2. FIG. 17 shows examples in which the permanent magnet 2 shown in FIGS. 14A and 14B is fixed directly to the yoke 4. In some embodiments, the permanent magnet 2 may not be fixed to the yoke 4, or the yoke 4 may be omitted. When the permanent magnet 2 is not fixed directly to the yoke, the permanent magnet 2 needs to be fixed on the rotational shaft by a fixing member or a bearing. The fixing member is preferably be made of a material having a low magnetic permeability and a low electric conductivity such as a resin, so as to prevent a loss caused by leakage of magnetic flux or unnecessary eddy currents.

In the permanent magnet 2A, gaps are interposed between the magnetic poles arranged circumferentially. When the gaps between the magnetic poles are smaller than the gaps (air gaps) between the permanent magnet and the moving body 8 (rotating body 5), the magnetic flux near adjacent magnetic poles does not reach the moving body 8 (the rotating body 5) and form a closed magnetic path between the adjacent magnetic poles. To overcome this problem, the permanent magnet 2A includes gaps between adjacent magnetic poles to prevent a closed magnetic path from being formed.

In the permanent magnet 2B, each magnetic pole has a circular shape. The magnetic poles may have any shapes other than those in the permanent magnets 2A and 2B.

In the permanent magnet 2C, the entirety of the side surface opposed to the moving body 8 (rotating body 5) is constituted by a single magnetic pole (the N-pole or the S-pole). The occurrence of the eddy currents on the moving body 8 (rotating body 5) is caused by the moving body 8 (rotating body 5) moving relative to the magnetic flux. Therefore, the eddy currents occur on the moving body 8 (rotating body 5) and the permanent magnet is subjected to a reaction force produced by the eddy currents, although the direction of the magnetic flux from the permanent magnet 2C does not change. With this arrangement, the magnetic flux is constant irrespective of the rotational position of the permanent magnet 2, the reluctance torque in the rotational direction can be zeroed. However, the amount of magnetic flux linked with the coils 3 does not change, and therefore, the induced electromotive force cannot be produced at the coils 3 by the permanent magnet 2 in a direct manner.

As opposed to the permanent magnet 2c having an annular shape, the permanent magnet 2D has a disk-like shape. The permanent magnet 2D is similar to the permanent magnet 2C in that the entirety of the side surface opposed to the moving body 8 (rotating body 5) is constituted by a single magnetic pole (the N-pole or the S-pole).

Figure 18:
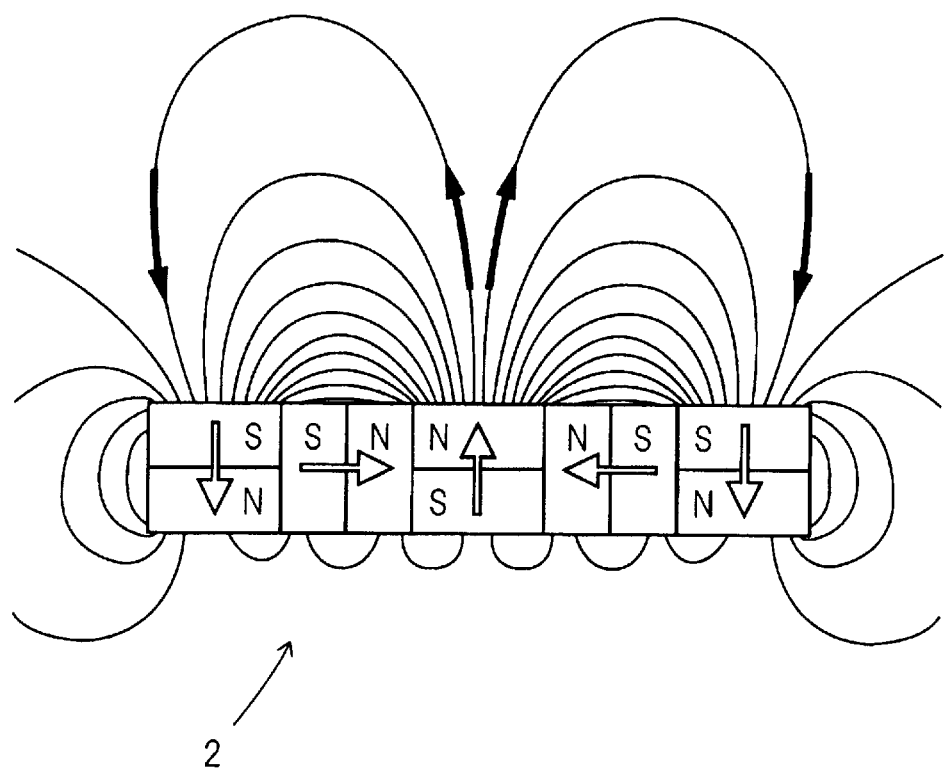
FIG. 18 is a schematic view of Halbach array structure.

As in FIG. 8 described above, when the coils 3 are disposed between the permanent magnet 2 and the moving body 5, the magnetic flux from the permanent magnet 2 needs only to run on the coils 3 side. Therefore, the permanent magnet 2 may have Halbach array structure. FIG. 18 is a schematic view of Halbach array structure. In Halbach array structure, the directions of adjacent magnetic poles are varied by 90 degrees such that the magnetic flux concentrates on one side surface of a magnet. With this arrangement, when the coils 3 are disposed between the permanent magnet 2 and the moving body 5 as in FIG. 8 for example, the amount of magnetic flux linked with the coils 3 can be increased. Therefore, even when the yoke 4 is omitted, it is possible to reduce leakage of the magnetic flux and achieve effective use of the magnetic flux.

Figure 19:
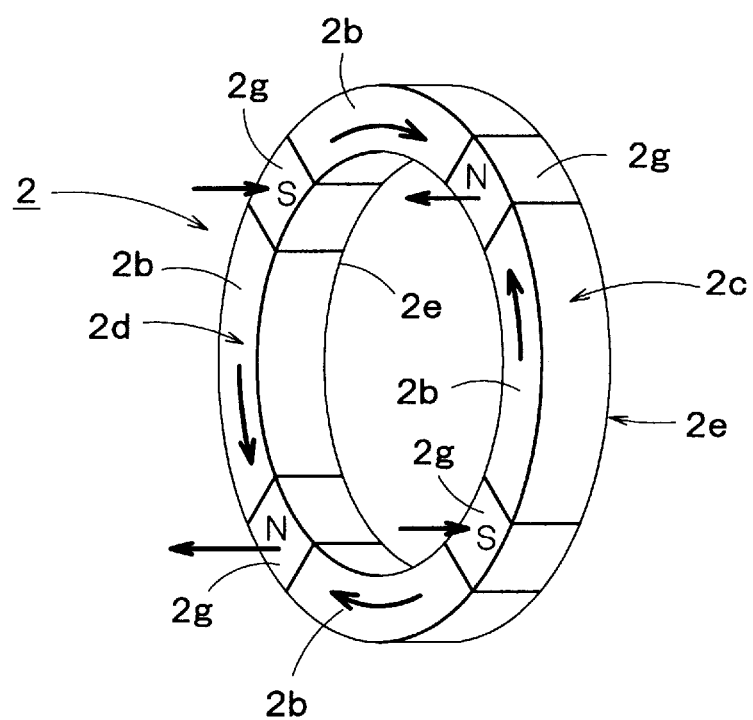
FIG. 19 shows the permanent magnet having Halbach array structure.

FIG. 19 shows an example of the permanent magnet 2 shown in FIG. 8 configured to have Halbach array structure. In FIG. 19, the permanent magnet 2 includes regions 2b in which magnetic poles are arranged in the circumferential direction and regions 2g in which magnetic poles are arranged in the direction normal to the circumferential direction. The regions 2b and the regions 2g are arranged alternately. Thus, with the permanent magnet 2 having Halbach array structure, the magnetic flux concentrates on one side of the permanent magnet 2 even when the yoke 4 is omitted.

Aspects of the present invention are not limited to the foregoing embodiments and embrace various modifications conceivable to those skilled in the art. Effects of the present invention are also not limited to the above-mentioned contents. That is, various additions, changes, and partial deletions are possible in a range not departing from the conceptual ideas and spirit of the present invention derived from contents defined in the claims and equivalents thereof.

What is claimed is:

1. A rotary electric machine, comprising:
a permanent magnet rotatable around a first rotational shaft and disposed at a distance from a main surface of a moving body rotating or moving, the main surface of the moving body being formed of an electrically conductive material, the permanent magnet having a side surface and an outer peripheral surface, a side surface of the permanent magnet opposed to the main surface of the moving body having a first portion faced with a side surface of the moving body and a second portion not faced with the side surface of the moving body,
one or more coils arranged at such positions as to be linked with magnetic flux from the permanent magnet, the one or more coils producing an induced current according to an amount of change of the magnetic flux linked with the one or more coils; and
a magnetic flux guide member provided in a magnetic path of the magnetic flux running from the permanent magnet, linked with the one or more coils, and returning to the permanent magnet, the magnetic flux guide member being disposed to face the second portion of the permanent magnet,
wherein the permanent magnet is rotated around the first rotational shaft by a reaction force acting on the permanent magnet, the reaction force being caused by eddy currents produced in the main surface of the moving body in such a direction as to hinder a change of magnetic flux from the permanent magnet, and
wherein a surface speed of the side surface of the permanent magnet opposed to the moving body is lower than a surface speed of the main surface of the moving body opposed thereto.

2. The rotary electric machine of claim 1, wherein when the moving body moves in one direction, the permanent magnet rotates around the first rotational shaft in a rotational direction corresponding to the one direction, the first rotational shaft extending in a direction intersecting the one direction.

3. The rotary electric machine of claim 1, wherein when the moving body rotates around a second rotational shaft, the permanent magnet rotates around the first rotational shaft parallel to the second rotational shaft in a rotational direction corresponding to a rotational direction of the moving body.

4. The rotary electric machine of claim 3, wherein at least the part of the side surface of the permanent magnet continuous to the outer peripheral surface of the permanent magnet is opposed at a distance to at least a part of a side surface of the moving body continuous to an outer peripheral surface of the moving body, and
wherein the permanent magnet is rotated in a direction corresponding to the rotational direction of the moving body by a reaction force acting on the permanent magnet, the reaction force being caused by eddy currents produced in the side surface of the moving body continuous to the outer peripheral surface thereof in such a direction as to hinder a change of magnetic flux from the permanent magnet.

5. The rotary electric machine of claim 3, wherein half or less of a total area of the side surface of the permanent magnet on a moving body side is opposed to the moving body.

6. The rotary electric machine of claim 1, wherein, when the moving body rotates around a second rotational shaft, the first rotational shaft is positioned in an extension of the second rotational shaft,
wherein an entirety of the side surface of the permanent magnet on a moving body side is opposed to the moving body, and
wherein the permanent magnet rotates in a same direction as the moving body.

7. The rotary electric machine of claim 1, wherein the permanent magnet includes two or more magnetic poles opposed to the moving body, each of the two or more magnetic poles being magnetized in a direction toward the moving body opposed thereto or an opposite direction.

8. The rotary electric machine of claim 1, wherein the permanent magnet includes two or more magnetic poles opposed to the moving body, and
wherein the one or more coils are provided for each of one or more of the two or more magnetic poles.

9. The rotary electric machine of claim 1, wherein the one or more coils are provided to face another side surface of the permanent magnet opposite to the side surface thereof opposed to the moving body.

10. The rotary electric machine of claim 1, wherein the one or more coils are provided between the side surface of the permanent magnet opposed to the moving body and the main surface of the moving body.

11. The rotary electric machine of claim 10, wherein the permanent magnet has Halbach array structure.

12. The rotary electric machine of claim 1, wherein the one or more coils are provided to face another side surface of the permanent magnet opposite to the side surface thereof opposed to the moving body, and
wherein the magnetic flux guide member is disposed to face a surface of the one or more coils opposite to a surface thereof opposed to the permanent magnet.

13. The rotary electric machine of claim 1, wherein the one or more coils are provided to face another side surface of the permanent magnet opposite to the side surface thereof opposed to the moving body, and
wherein the magnetic flux guide member comprises:

a first magnetic flux guide member disposed to face a surface of the one or more coils opposite to a surface thereof opposed to the permanent magnet; and a second magnetic flux guide member disposed to face the side surface of the permanent magnet on a moving body side at a portion not opposed to the moving body.

14. The rotary electric machine of claim 13, wherein the second magnetic flux guide member is disposed in a part of a region in which the permanent magnet and the moving body are opposed to each other.

15. The rotary electric machine of claim 1, further comprising: one or more core members inserted into the one or more coils to increase a density of magnetic flux passing the one or more coils.

16. The rotary electric machine of claim 1, further comprising: a magnetic flux guide member having an annular shape and passed by the magnetic flux from the permanent magnet, wherein the one or more coils are wound around the magnetic flux guide member.

17. The rotary electric machine of claim 1, further comprising: a drive body to be driven by a rotational force of the first rotational shaft.

18. The rotary electric machine of claim 17, wherein the drive body is a motor.

19. A non-contact power generator, comprising:

a permanent magnet rotatable around a first rotational shaft and disposed at a distance from a main surface of a moving body rotating or moving, the main surface of the moving body being formed of an electrically conductive material, the permanent magnet having a side surface and an outer peripheral surface, a side surface of the permanent magnet opposed to the main surface of the moving body having a first portion faced with a side surface of the moving body and a second portion not faced with the side surface of the moving body, and one or more coils arranged at such positions as to be linked with magnetic flux from the permanent magnet, the one or more coils producing an induced current according to an amount of change of the magnetic flux linked with the one or more coils, and a magnetic flux guide member provided in at least a part of a magnetic path of the magnetic flux running from the permanent magnet, linked with the one or more coils, and returning to the permanent magnet, the magnetic flux guide member being disposed to face the second portion of the permanent magnet, wherein the permanent magnet is rotated around the first rotational shaft by a reaction force acting on the permanent magnet, the reaction force being caused by eddy currents produced in the main surface of the moving body in such a direction as to hinder a change of magnetic flux from the permanent magnet, and a surface speed of the side surface of the permanent magnet opposed to the moving body is lower than a surface speed of the main surface of the moving body opposed thereto.

* * * * *